(12) United States Patent
Al Amri

(10) Patent No.: US 7,232,065 B2
(45) Date of Patent: Jun. 19, 2007

(54) LUGGAGE COLLECTION INSTALLATION

(76) Inventor: Moosa Eisa Al Amri, Al Reem Tower, Maktoum Street - P.O. Box 14427, Dubai (AE)

( * ) Notice: Subject to any disclaimer, the term of this patent is extended or adjusted under 35 U.S.C. 154(b) by 0 days.

(21) Appl. No.: 11/268,427

(22) Filed: Nov. 7, 2005

(65) Prior Publication Data

US 2006/0049247 A1   Mar. 9, 2006

Related U.S. Application Data

(63) Continuation of application No. 10/739,247, filed on Dec. 18, 2003, now Pat. No. 6,994,250.

(30) Foreign Application Priority Data

Jul. 16, 2001  (AE) ................................ 177/2001

(51) Int. Cl.
G07B 15/02 (2006.01)

(52) U.S. Cl. ...................................... 235/384; 235/375

(58) Field of Classification Search ................ 235/375, 235/384; 705/5–6, 13; 198/370.07, 358, 198/349, 349.5, 349.8, 350
See application file for complete search history.

(56) References Cited

U.S. PATENT DOCUMENTS

| 4,634,849 | A | * | 1/1987 | Klingen ...................... 235/487 |
| 5,051,565 | A | | 9/1991 | Wolfram |
| 5,928,708 | A | | 7/1999 | Hansmire |
| 5,943,651 | A | | 8/1999 | Oosawa |
| 6,097,292 | A | | 8/2000 | Kelly |
| 6,112,997 | A | | 9/2000 | Jelinek |
| 6,158,658 | A | | 12/2000 | Barclay |
| 6,220,422 | B1 | * | 4/2001 | Lee ........................ 198/370.07 |
| 6,698,653 | B1 | | 3/2004 | Diamond |

FOREIGN PATENT DOCUMENTS

| EP | 0271022 | 6/1998 |
| GB | 2313221 | 6/1997 |
| GB | 2351379 | 12/2000 |
| JP | 2000011055 | 1/2000 |
| WO | WO9815921 | 4/1998 |
| WO | WO9916015 | 4/1999 |
| WO | WO0027344 | 9/2000 |

* cited by examiner

Primary Examiner—Lisa M. Caputo
(74) Attorney, Agent, or Firm—Sturm & Fix LLP

(57) ABSTRACT

A luggage collection installation, located at a place of arrival where passengers disembark from an aircraft or other means of transportation with passenger coupon parts (31) of boarding passes, is arranged to facilitate luggage delivery. The passenger coupon parts (63) contain encoded luggage identification corresponding to identification data on transported luggage. The installation comprises at least one reader/writer (5) for the passenger coupon parts (63) and means (4) for reading luggage identification data carried by luggage to be collected on a conveyor (2), and which corresponds to encoded luggage identification data stored in the passenger coupon part (63) of the boarding passes. A plurality of luggage outlets (3) are each associated with a reader/writer with a slot (5) for the passenger coupon parts, and arranged for removing luggage or for allowing removal of luggage from the luggage collection installation when the luggage identification data associated with the luggage corresponds to that on the passenger coupon part (63) of a boarding pass inserted in the reader/writer slot (5).

14 Claims, 20 Drawing Sheets

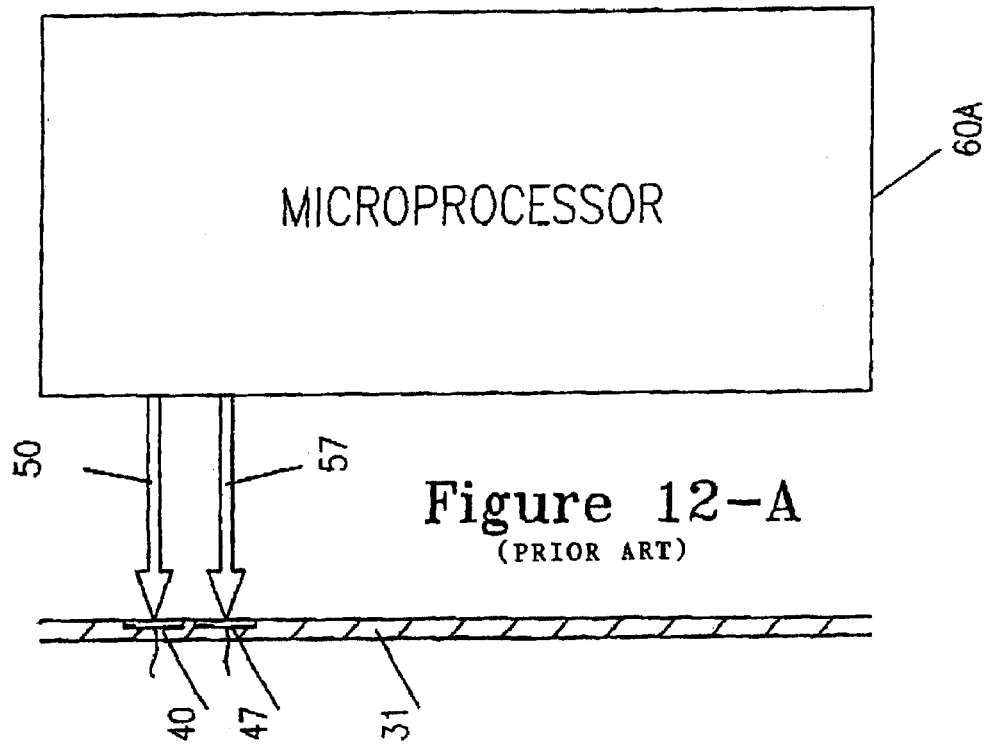
Figure 12-A
(PRIOR ART)
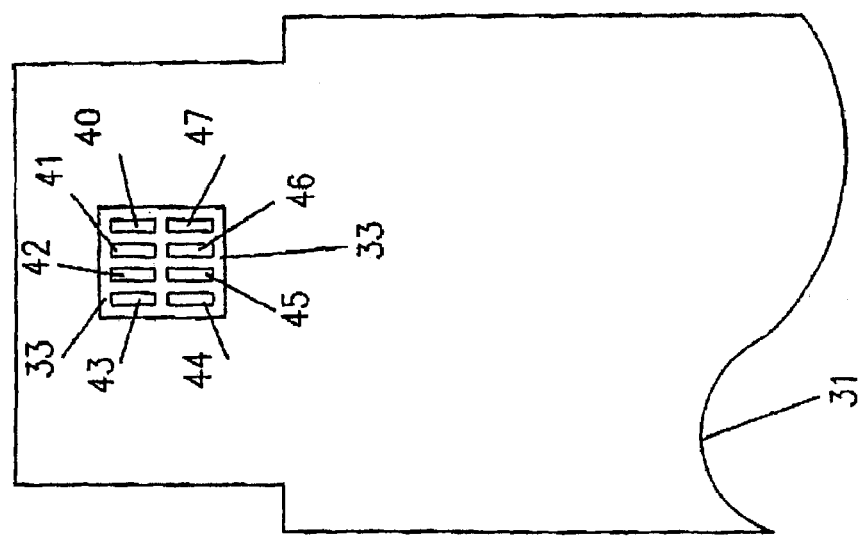
Figure 12-B
(PRIOR ART)

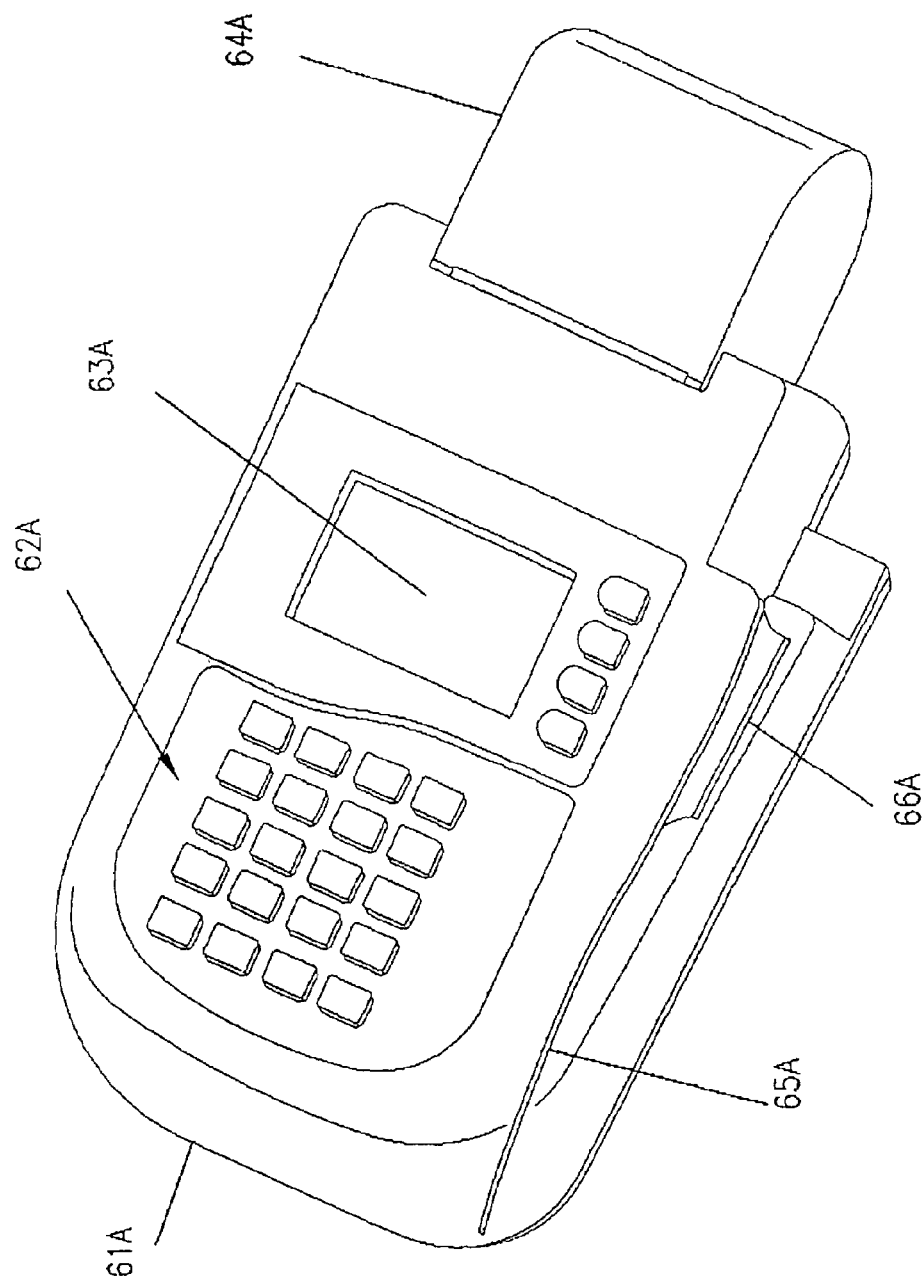
Figure 12/C

LUGGAGE COLLECTION INSTALLATION

CROSS REFERENCE TO RELATED APPLICATIONS

This application is a Continuation of U.S. patent application Ser. No. 10/739,247 filed Dec. 18, 2003 now U.S. Pat. No. 6,994,250, entitled SMART BOARDING PASS, and is incorporated by reference herein in its entirety..

FIELD OF THE INVENTION

The invention relates to Boarding Passes for use in boarding passengers in aircraft or other means of transportation and/or while the passengers are aboard and/or after disembarkation, as well as to a system for issuing and processing the Boarding Passes and a luggage collection installation using the Boarding Passes.

BACKGROUND OF THE INVENTION

The invention is related to a system, means, electronic devices, magnetic strips and storage chips used to produce Boarding Passes, and the usage thereof. The aim is to avoid the defects in the old paper Boarding Passes that were equipped with a magnetic strip. The new invention avoids losing the information from the magnetic strips due to bending the tickets or wetting or otherwise.

It also avoids the inability to read the old Boarding Pass that was equipped with a magnetic strip, when tearing off the passenger coupon part of the Boarding at the perforated line separating the two parts. The new invention achieves quick electronic circulation of the information in the new Boarding Pass by using a new design or storage chips applied preferably on thick plastic parts or any other part on the Boarding Pass. It also uses electronically controlled printing and reading devices. Also it can be used to finalize writing the particulars of the entry card to the destination airport and security requirements to exit from the departure airport. It also enables identification and retrieval of the passenger's luggage on the Boarding Pass by writing particulars of the luggage on the magnetic strips and/or the storage chips.

The invention includes issuing the new Boarding Pass with front and rear faces carrying visible printed information in correspondence with encoded data stored in the magnetic strips and/or storage chips that is readable by means of a suitable reading device. Accordingly it is possible to match the visible printed information with the ciphered and stored information to discover any unauthorized modifications to the Boarding Pass.

The invention aims to take care of the needs of air passengers from the date of their intention to travel until return home by attending to all these needs in the data stored in the Boarding pass which through a central system for the Boarding Pass can attend to these needs at different stages of travel without losing time or wasting efforts and while preserving security.

The invention relates to a Boarding Pass made of paper and/or plastic or other materials. The Passes are compacted with a magnetic strip and/or storage chips where reading devices are used to reveal any unauthorized modifications. The following is a summary of the field of the old techniques: (a) magnetized strips and (b) storage chips.

A—Old Techniques using Magnetic Strips and/or Magnetized Strips

Using magnetic strips and/or magnetized strips is a well-known technique in many fields of application including using magnetic strips in metro tickets which are used to enter and exit from metro stations.

Magnetic strips programmed by special programming systems equip in this case metro tickets and, through reading devices at the gate, it is possible to deal with the tickets according to the information registered in the magnetic strip e.g. the number of stations. The ticket holder can pass as per the pre-programmed particulars at the gates using reading devices stationed at the gates. The same applies to monthly, quarterly or annual subscriptions.

As mentioned, magnetic strips and/or magnetized strips can be numerically programmed according to the number of the stations in the daily tickets, which are used only once. Programming such strips achieves the aimed-for purpose. These strips are processed through programming and reading systems for the purpose of achieving financial and economic security and saving time and effort, also criminal security by not allowing those who do not hold tickets or subscriptions to enter or exit from the stations.

Magnetic or magnetized strips have other applications for instance for access to hotel rooms where the magnetic strips are used as a key and the locks are used as a reader for the strips. If the particulars on a strip are identical with those stored in the lock, the door opens.

Magnetic strips and/or magnetized strips are also used in the field of air tickets particularly for Boarding Passes.

After booking on an airplane and when the passenger who is holding an ordinary ticket reaches the airport, this paper ticket or an electronic ticket serves to obtain, or is exchanged for, a Boarding Pass equipped with a magnetic and/or magnetized strip programmed with particulars of the passenger and flight, especially the seat, row, gate number and any other information.

One portion of the Boarding Pass equipped with the magnetic strip is retained by the airline representative before the passenger heads for the plane whereas the other portion of the Boarding Pass, with an indication of the booked seat place, is retained by the passenger for entry into the plane.

This achieves two types of security: economic security by avoiding tampering or forging the tickets; and criminal security by allowing only the entitled ticket holder to board.

B—Old Techniques in the Field of Storage Chips

Storage chips are used in everyday life in telephone cards, all types of smart cards and more recently in smart cheques.

Smart Cards:

Smart cards are similar to credit cards, with a computer storage chip capable to store and transmit information. Processor Cards contain a memory and processor, which is capable to transmit/restore information that makes this sort of card a unique procedure in personal identification. Operating the information also allows dynamic storage management, which makes such cards multi usage.

Smart Card technology has grown tremendously in Europe; as an example telephone cards that came into widespread use due to the high costs of communications that made on-line operation very costly. ID Smart Cards are also used in sales outlets and for securing entry into buildings, computers and banks.

Smart Card technology provides a large storage capacity for storing and searching a variety of information. It also can manage high security operations to search personal identification information i.e. photos, signatures, fingerprints etc.

Storage chips can also be made from plastic instead of silicon, which could revolutionize the communications industry. Production of plastic storage chips would not drive silicon from the market, but would help in establishing a new generation of inexpensive smart storage chips.

Various types of Smart Cards are available:

1—Proximity Cards

Proximity cards or simply "prox cards" communicate through an antenna similar to contactless smart cards except that they are read-only devices that generally have a greater range of operation. The range of operation for prox cards is typically from 2.5" to 20" (63.5 mm to 508 mm) depending on the reader. It is possible to read a small amount of information with prox cards such as an identification code that is usually verified by a remote computer; however, it is not possible to write information back to the card. Prox cards are available from several sources in both ISO thickness cards from 0.027" to 0033" (0.686 mm to 0.838 mm) and "clamshell" cards from 0.060" to over 0.070" thick (1.52 mm to over 1.78 mm).

Prox cards continue to grow in popularity because of the convenience they offer in security, identification, and access control applications, especially door access where fast, hands-free operation is preferred.

Select Card Printer/Encoders can be with an optional e-card docking containing a prox card encoder. Printer/Encoders equipped with this option are used to read information from the memory of prox chips, print on the front and back of the ISO version card (which e.g. complies with HID Prox Card specifications) and encode either an ISO or JISII magnetic stripe, all in a seamless one-pass process.

2—Contact Smart Cards

Contact smart cards are the size of a conventional credit or debit card with a single embedded integrated circuit chip that contains just memory or memory plus a microprocessor. Memory-only chips are functionally similar to a small floppy disk. They are less expensive than microprocessor chips, but they also offer less security so they should not be used to store sensitive or valuable information. Chips that contain both memory and a microprocessor are also similar to a small floppy disk, except they contain an "intelligent" controller used to securely add, delete, change, and update information contained in memory. The more sophisticated microprocessor chips have state-of-the-art security features built in to protect the contents of memory from unauthorized access.

Contact smart cards must be inserted into a card acceptor device where pins attached to the reader make "contact" with pads on the surface of the card to read and store information in the chip. This type of e-card (that complies e.g. with the ISO 7816 standard Parts 1–4 (T=0,T=1)) is used in a wide variety of applications including network security, vending, meal plans, loyalty, electronic cash, government IDs, campus IDs, e-commerce, health cards, and many more.

3—Contactless Smart Cards

In addition to the features and functions found in contact smart cards, contactless smart cards contain an embedded antenna instead of contact pads attached to the chip for reading and writing information contained in the chip's memory. Contactless cards do not have to be inserted into a card acceptor device. Instead, they need only be passed within range of a radio frequency acceptor to read and store information in the chip. The range of operation is typically from about 2.5" to 3.9" (63.5 mm to 99.06 mm) depending on the acceptor.

Contactless smart cards are used in many of the same applications as contact smart cards, especially where the added convenience and speed of not having to insert the card into a reader is desirable. There is a growing acceptance of this type of card for both physical and logical access control applications. Student identification, electronic passport, vending, parking and tolls are common applications for contactless cards.

Select Card Printer/Encoders can be with an optional e-card docking containing a contactless smart card encoder. Printer/Encoders equipped with this option are used to read and store information in the chip's memory, print on the front and back of the card (that complies e.g. with Mifare®/ISO 14443 standards) and encode either an ISO or JISII magnetic stripe, all in a seamless one-pass process.

4—Hybrid Cards

Hybrid card is the term given to e-cards that contain two or more embedded chip technologies such as a contactless smart chip with its antenna, a contact smart chip with its contact pads, and/or a proximity chip with its antenna, all in a single card. The contactless chip is typically used for applications demanding fast transaction times, like mass transit. The contact chip can be used in applications requiring higher levels of security. The individual electronic components are not connected to each other even though they share space in a single card. Hybrid cards offer a unique solution for updating existing badging systems. This e-card can accommodate the infrastructure and card technology of a legacy system while adding new applications and e-card technologies, all in a single ID card.

Select Card Printer/Encoders can be ordered with an optional e-card docking station containing any combination of up to three different types of e-card encoders. A printer/encoder equipped with all three enables the user to read and/or store information in the memory of three different embedded e-card chips, print on the front and back of the card, and encode either an ISO or JISII magnetic strip, all in a seamless one pass process. In this case, the e-card chips should comply with the specifications for the ISO 7816 standard Parts 1–4 (T=0,T=1), the Mifare®/ISO 14443 standard and/or HID Prox Cards standard.

5—Combi Cards

The combi card—also known as a dual-interface card—has one smart chip embedded in the card that can be accessed through either contact pads or an embedded antenna. This form of smart card is growing in popularity because it provides ease-of-use and high security in a single card product. Mass transit is expected to be one of the more popular applications for the combi card. In the mass transit application, a contact-type acceptor can be used to place a cash value in the chip's memory and the contactless interface can be used to deduct a fare from the card.

Select Card Printer/Encoders can be ordered with an optional e-card docking station containing a contact smart card encoder and/or a contactless smart card encoder. These printer/encoders can be used to read and/or store information in the chip, print on the front and back of the card and encode either an ISO or JISII magnetic stripe, all in a seamless one-pass process. In this case, the card complies e.g. with Mifare®/ISO 14443 standards and/or the ISO 7816 standard Parts 1–4 (T=0,T=1).

This discussion of the various types of smart cards is intended to illustrate the prior art, and to clarify the possibilities of using the prior technology in the present invention as a component of the Boarding Passes or for luggage identification, etc.

Inventions in the Prior Art:

GB 2351 379-A "Smart card with business partner scheme or travel application" mentioned that despite advances in information technology and process streamlining with respect to travel arrangements, the modern traveler is often subjected to unnecessary delays, petty inconveniences, and oppressive paperwork. These travel burdens are most evident in the airline, hotel, and rental car industries, where arranging and paying for services and accommodation can involve significant time delays due to miscommunication, poor record-keeping, and a host of other administrative inefficiencies.

It was stated that these cards remain incompatible; that is, due to differing file structures and/or communication protocols employed, card data typically cannot easily be shared across applications or between industry participants. Systems and methods were therefore needed in order to overcome these and other shortcomings in the prior art. A method and apparatus for a smart card system was provided which securely and conveniently integrated important travel-related applications in order to overcome the limitations of the prior art. In one aspect, a smart card system comprised cardholder identification applications and various additional applications useful in particular travel contexts; for example, airline, hotel, and rental car.

WO 9916015 "Contactless Proximity Automated Data Collection System And Method" proposed a fast data transfer collection system using message authentication and contactless RF proximity card technology in non-contact storage and retrieval applications.

In U.S. Pat. No. 6,097,292 "Contactless Proximity Automated Data Collection System And Method", a target provides control of an RF antenna and resolves collisions between multiple tags in the RF field. A tag provides reliable, high speed, and well-authenticated secure exchange of data/information with the host.

WO 00/57344 "Contactless Smart Card Reader" related to a contactless smart card reader formed by a visual display unit incorporating a display screen and a smart card power and reading antenna arranged to supply power to and read data from a contactless smart card placed adjacent to the screen. Preferably the antenna is formed behind the display screen and the contactless smart card is read through the display screen.

U.S. Pat. No. 5,943,651 "Automatic Airline Ticket Issuer And Entry Card Creating System" describes an airline ticket consisting of a main ticket part and a passenger coupon part which are separable from one another along a perforated line. A magnetic strip is formed over both parts of the ticket and encoded data is stored in the magnetic strip. In standard tickets, when the boarding of a passenger was being confirmed, the entire ticket was passed through a reader to read the encoded data. Then, when the boarding formalities were being completed, the ticket was divided along the perforated line and the coupon part handed to the passenger. Dividing the ticket disconnected the tracks on the magnetic strip that became unreadable so that if the ticket were entered in the reader a second time, the boarding information could not be read. This was used to prevent a double confirmation of a boarding.

This U.S. Pat. No. 5,943,651 proposed to make use of the magnetic strip spanning the two parts of the ticket to automatically generate entry cards. For this, all items of boarding information were recorded in the parts of the tracks of the magnetic strip on the main part of the ticket, and all items of information to be entered on an entry card were recorded in the parts of the tracks of the magnetic strip on the passenger coupon, this requiring the emplacement of dummy data in the region peripheral to the perforated boundary line. When this ticket was divided, the entry card data in the passenger coupon could be read and used to print an entry card. However, this system necessitated a complicated arrangement to insert dummy data in order to divide the single magnetic strip into different sections. Moreover, the system was limited to printing entry cards.

The Old Technique in the Field of Airline Tickets

Airline tickets have been in widespread use for many years. Developments thereof have related to two aspects: inspection and rapidity of implementation. The steps to issue an ordinary airline ticket can be summarized as: the passenger goes to the office of an airline or its approved agent to request a ticket, then the competent staff takes the passenger's particulars and enters them in a computer which is arranged to print and issue a paper ticket. It may take some time, sometimes more than an hour, to finalize the formalities. It also take some time to finish writing the passenger's particulars on the ticket. Then the passenger pays the fare, receives his ticket and in due course proceeds to the airport, say more than two hours from the time specified in the ticket to allow enough time to finish the trip formalities. He starts by presenting the paper ticket, which may consist of an original and a carbon copy, to the given airline counter. Then the ticket is reviewed against the information stored in the computer. This shows the booking confirmation and ensures that the ticket's information are identical with the information stored in the computer. Then the luggage is weighed and the passenger is given a ticket without a carbon copy. Next he is furnished with stickers a copy of which is stuck to the luggage and a portion is stuck on the ticket, and is given a Boarding Pass for access to the plane, which normally consisted of a piece of paper having written on it the flight number, date of departure, time of departure, gate number, and seat number. The Boarding Pass has a magnetic strip storing the same information along with any other necessary bibliographic information, for instance as described in the prior art discussion in the above-mentioned U.S. Pat. No. 5,943,651.

Thereafter, the passenger goes to the specified gate to board the plane. At the boarding gate the information is checked and the passenger is given a passenger coupon portion of the Boarding Pass and the company keeps the other portion. Then the passenger boards the plane and locates his seat place from the particulars registered on the Boarding Pass.

The numbers of the passengers are counted/controlled by specific staff upon boarding and before departure.

For international travel, an entry card for the destination country may be distributed to the passengers, which contains particulars written in many languages including the language of the destination.

The old technique has many disadvantages:

1—Registering the particulars on the paper airline ticket is extremely slow. The inability for quick circulation of the particulars delays the passenger at the airline offices and at the airport and as a consequence the passengers lose a lot of time which may exceed the real time of the trip, from the time of departure to the time of arrival.

2—Issuing airline tickets by this procedure does not achieve an acceptably swift processing of flight formalities, which needs to be done in less time and with less effort for the passenger, the airport and the airline personnel.

3—Air transport aims to reduce travel time and preserve comfort, but the old system does not achieve this.

4—Some flights are less than two hours, whereas airline companies request passengers to reach the airport two hours or so before the departure to enable them to finalize flight formalities. A large part of this time is consumed at the ticket offices and weighing luggage.

5—Some of the passenger Boarding Passes equipped with a magnetic strip become spoiled due to folding the Boarding Pass which makes the particulars unclear, forcing the counter personnel to use traditional means to ensure the correctness of these particulars before allowing the passenger to the departure gate. The aforesaid procedures may consume a lot of time, which may lead in delaying the passenger to board his plane, and the airline could lose a seat.

6—The standard Boarding Pass, equipped with a magnetic strip and composed of two parts separated by a perforated line, is made difficult to read upon separating the two portions. Also if the tickets were exposed to wet or sweat, it could lose the magnetically stored information and particulars which would lead to a waste of time and effort of both the passenger and airline staff.

7—Paper tickets can be forged.

8—The old luggage handling system, using stickers to be fixed on the luggage and the passengers' tickets, consumes a lot of time in inputting the passenger information.

9—Queuing in front of the immigration officer to check the particulars of the passengers consumes a lot of time.

10—Filling the entry card needs knowledge of the language used in the same. Mostly the used language is English and sometimes the native language is used. Sometimes there are obstacles in filling the card, such as: the passenger is under age, sleeping, over age, sickness, not knowing the language in which the cards were written and bad handwriting which all may delay a proper exit from the airport. Also there may be a similarity in the names that cannot be discovered quickly.

SUMMARY OF THE INVENTION

The invention relates to a system, means, electronic devices, magnetic strips and storage chips used to produce and process Boarding Passes. The aim is to avoid the defects in the old paper Boarding Pass that was equipped by a magnetic strip. The new invention avoids losing encoded data from the magnetic strips due to bending the tickets or wetting it or otherwise.

As set out in the claims, the invention pertains to the new Boarding Pass; a system for issuing the Boarding Passes and for processing the Boarding Passes before passengers board an aircraft or other means of transportation and/or while the passengers are aboard and/or after disembarkation; methods of processing the Boarding Passes; and a luggage collection installation and method.

The invention avoids the inability to read the old Boarding Pass that was equipped with a magnetic strip, when tearing off the passenger coupon part of the Boarding Pass at the perforated line separating the two parts. It achieves assuring the quick electronic circulation of the information in the new Boarding Pass by using a new design or storage chips, preferably by merging the same on thick plastic parts or any other part on the Boarding Pass. It also uses electronically controlled printing and reading devices. Also it can be used to finalize writing the particulars of the entry to the destination airport and provide a security check notably at the exit from the departure airport. It also enables writing the particulars of the passenger's luggage on the Boarding Pass by writing the same on the magnetic strips or the storage chips.

The invention includes issuing the new Boarding Pass with front and rear faces carrying visible printed information and magnetic strips and/or storage chips where invisible information is encoded stored and readable via a suitable reading device so the visible information can be matched with the stored encoded information to discover any unauthorized modifications in the Boarding Pass.

The invention aims to care about the needs of air passengers from the date of intention to travel until return home by dealing with all these needs together so the traveler can proceed through all stages of travel without losing time or effort, through the new Boarding Pass and a central system for the Boarding Pass that also preserves security.

By placing separate magnetized strips and/or storage chips preferably on thick portions of the Boarding Pass, the storage capacity can be increased and each can be easily programmed with the requisite encoded data that can also be read from each part of the boarding card and with greatly reduced risk of damage thereto. This enables the Boarding Pass to be used for a much wider range of applications including electronic clearance in case of change of airline, security checks, activities during transit including access to transit areas, point-of-sales transactions including duty-free shopping on ground or aboard, counting and checking the number of boarding passengers, automatic production arrival cards or exit cards, luggage identification, collection and tracing/retrieval and so on, as more fully set out below and in the claims.

Advantages of the Invention

1—Possibility of reducing the passenger's lost time at airline booking offices, the airline offices in the airport, security gates, departure gates, boarding, sitting in the seat, filling the entry card, deboarding, checking his particulars at the destination authorities and nationality in the host country and the possibility of circulating all the relative information easily and quickly until receiving his luggage and entering the destination country, which would decrease the time consumed to several minutes instead of hours.

2—The possibility of transferring and circulating the passengers' particulars easily and quickly between all concerned locations and staff without waiting to write the particulars manually or by using the computer keys.

3—There is a saving of time, effort and money outside the airport, for passengers and for the teams who serve the passenger either in the airline offices outside or inside the airport or at the departure and transit points or when boarding.

4—It provides a possibility of registering and circulating all particulars of entry cards through circulating those particulars which were readable and stored in a magnetic strip or storage chips of the new Boarding Pass for all departments dealing in these particulars.

5—It assists in accomplishing an easy and short trip and in saving time for the passengers and those dealing with him.

6—It maintains economic security by saving expenses, effort, money and time to achieve criminal security by reducing the possibility for tampering with or forging the same These advantages are achieved by the new Boarding Pass and by the system for issuing and managing it. The invention provides a new means and system to issue new Boarding Passes to achieve the target to the utmost benefit, ensure accurate and quick circulation of information to save time, effort and money such that the passenger can finalize his transactions in minutes starting from issuing the new Boarding Pass until deboarding at his destination with all what is needed to fill an entry card. The passenger exits from the departure airport with the magnetic information stored in the new Boarding Pass until boarding the plane in a few minutes as per the system, procedure and the new Boarding Pass which advantageously contains particulars for generating an entry card.

The system provides the possibility of circulating any information registered in the magnetic strips or storage chips on the new Boarding Pass through the reading/writing devices installed at all outlets, customs and immigration instead of rewriting the same manually in the computer.

A Comparison Between the New and the Old Boarding Pass

The Old Boarding Pass
1—Cannot circulate the Boarding Pass particulars unless recording the same again in the computer by keying-in and printing, which consumes a lot of time.
2—Can transfer or circulate this information only through communications systems between the airlines offices and the systems and the joint database.
3—Has no easy-to-manage system to print entry cards, so the cards still need to be filled manually which may lead to mistakes including language problems, or problems in understanding due to being young or in poor health.
4—Passenger information is still manually circulated and checked.
5—Issuing the Boarding Pass consumes a lot of time. Mistakes may occur due to printing the information many times using computer keyboards.
6—With the old Boarding Pass, the passenger needs to stand in long queues to finish his dealings at any station. The passengers waste time, which can be infuriating and boring. Hours may be needed for any transaction, so both time and efforts are wasted.

The New Boarding Pass
1—The system's capacity for writing and reading on magnetic strips and/or storage chips (contact and/or contactless types) fixed on thick portions of plastic or otherwise offers the possibility of completely registering all of the passenger's particulars and flight details on the Boarding Pass.
2—All particulars of the passenger and the flight can be readily and immediately accessed by passing the Boarding Pass or inserting the same in devices for reading all particulars stored in the magnetic strips or the contact and/or contactless storage chips fixed on thick edges of plastic or otherwise. Such thick parts can have standard specifications suitable for available writing and reading equipment. Such reading of the information saves time consumed in re-writing.
3—Information can be circulated locally without having to rely on a main communications system between the airline offices and any other bodies, using the storage chips of the contact and/or contactless types chips fixed on the thick portions.
4—There is a possibility of writing and circulating all particulars for an entry card by passing or inserting the Boarding Pass carrying the magnetic strips and/or storage chips (contact and/or contactless) fixed on thick edges in a suitable reading device, whereupon all particulars would be displayed immediately and can be circulated and printed in a proper, secure and accurate manner.
5—All particulars of the passenger and the flight can be verified automatically by passing or inserting the Boarding Pass carrying the magnetic strips and/or storage chips (contact and/or contactless) fixed on thick edges in a suitable reading device, with the possibility of separating and circulating all its particulars immediately without errors and without waiting to write these particulars manually or by using a computer keyboard.
6—Only a few minutes are required for issuing the Boarding Pass, verifying, checking all its particulars on the magnetized strips or the contact and/or contactless storage chips fixed on thick edges. The information can immediately be circulated without any delay, which saves time and efforts of the passengers, the verifiers at the airline companies, and the personnel of the airport authorities in the departure and destination countries.
7—Only a few minutes is needed to board the plane and there is no need to stand in queues which leads to a saving in effort and time and offers the passenger a comfortable and less exhausting trip without boredom.

Further Features of the Invention

The invention is connected with methods, systems, electronic devices, magnetic strips and/or storage chips (contact and/or contactless) used in producing Boarding Passes and usage of the Boarding Passes aiming to avoid some or all of the aforementioned defects of the previous tickets. Using this method, equipment, the proposed system and the Boarding Pass achieves many goals including a smooth and quick trip and the possibility of circulating and transferring the passengers' particulars through electronic devices starting with ticket booking offices, airlines and all concerned bodies in the airports. This enables the passengers to board the plane quickly, easily and smoothly and have a comfortable trip which would save time and effort for the passengers, the airline company and its team, and at transit outlets and immigration inlets in the airports.

The old system used to consume a lot of time in writing the particulars of the passenger at booking offices then printing the ticket and confirming the booking which consumes the passengers' time to pass all these formalities before the airline offices in the departure airport and consumes even more time to confirm the particulars at the transit points and with the representatives of the Ministry of Interior, immigration and the gates leading to the plane, where the passenger needed to spend a long time at each of these places.

In addition there was no easy-to-manage system to write entry cards to the destination airports inside the plane easily and smoothly. Frequently, a lot of mistakes are made when writing the entry card inside the plane due to difficulties in knowing some languages, inaccuracy, unclear handwriting or otherwise. Furthermore, some of the passengers would not be able to complete their particulars on the entry card due to: being old or young: unawareness; health problems or otherwise, which consumes a lot of time and effort in addition to unsatisfactory accuracy and incomplete security.

So, an aim of the invention is to remedy some or all of these problems, save time and effort and provide a comfortable trip for the passenger (and travel companies); and reduce work for airline company teams i.e. the booking offices, head office and the airline offices in the airport; immigration officers, departure gates, when boarding the plane, in writing entry cards for the destination airport in the host country, and for the immigration systems at the destination airport and at transit points.

With the new system the passenger takes the following steps starting from the booking office:

1—The passenger goes to the particular airline office to book an air ticket.
2—The concerned officer in the airline office writes the following particulars of the passenger:
   a—Particulars of the passenger: (Name-nationality-date of birth-age-sex-profession-passport number).
   b—Particulars of the required trip, such as date and time of departure, name of the airline company, departure and designation airport, arrival, purpose of travel, duration of stay in the host country and all particulars for the entry card to the host country.
   c—Particulars of luggage at the time of departure, as known at the time of booking.
3—The particulars shall be written by magnetic encoding on the magnetic strips and/or storage chips through suitable writing and reading devices.
4—The passenger shall head at the specified time to the departure airport where the airline office confirms his particulars by passing the Boarding Pass through the writing and reading devices, and compares the written particulars with the coded data stored in the magnetic strips and/or storage chips (contact and/or contactless).
5—A—The luggage is weighed and particulars added on the Boarding Pass where they can be seen. The same particulars are added to the magnetic strips and/or the contact and/or contactless storage chips and a sticker (indicating weight and number of each suitcase or parcel) is put on the luggage for identification, whereby the seen and stored particulars match.
   B—On the new Boarding Pass shall be printed the flight number, time and airport of departure, gate number, seat number and particulars of smokers, all of which can be seen. By using the writing and reading devices, encoded data stored in the magnetic strips and/or the storage chips can be read, so all data can be seen and read by the devices. Any other information needed by the airline companies, airports, security bodies and the passenger can be printed and/or stored, for instance the passenger's insurance number which maintains all his particulars and family as well. Also it is possible to write any particulars needed by services companies which join the system, by adding a pin code.
6—The passenger shall pass by the transit points in the country from which he wants to depart.
7—All the information written in the magnetic strip and/or the contact or contactless storage chip can be circulated. Also all necessary information can be transmitted to the specified computers at the immigration through a reading device for the strip or the storage cell or chip. Passport information can be verified without a need to read/writing the same manually. It is possible to print and copy by using the keyboard and circulate the same to the department of immigration at the departure country.

The passenger can use the Boarding Pass for shopping in duty free shops. For this, the passenger's credit card number can be stored in the magnetic strips and/or the contact and/or contactless chips (refer to GB 2351379-A).

8—Then the passenger can go to the specified gate indicated on the Boarding Pass (and stored in the magnetic strips or the contact and/or contactless storage chips) where the Boarding Card is separated into two and the passenger keeps the passenger coupon part of the Boarding Pass with him while the other part is retained by the airline company.
9—Upon entering the gate all particulars would be documented by passing the Boarding Pass through the writing and reading device. The seen and stored passport particulars ensure the identity of the passenger, and also his fingerprint can be compared with the fingerprint stored in the storage memory or the computer. Thereafter the permit of the concerned authorities for the passenger to depart is ensured and proof of his passing the departure gate is stored by the computer and on the Boarding Pass.
10—After, the passenger passes through the departure gate on his way to the airplane, carrying the passenger coupon part of the Boarding Pass. The main coupon part of the Boarding Pass is retained by the airline employee, used in electronic clearance, and constitutes proof that the passenger left the departure gate towards the airplane. For the passenger coupon part there are two possibilities: the first is that the passenger paid the fare to travel with the company indicated on the Boarding Pass and ticket, from the departure airport to the arrival airport. A second possibility is that passenger paid the travel fare to one company participating in the system but traveled with another company (the carrier company) that retained the main coupon part of the Boarding Pass. In the latter case the carrier company can use its part of the Boarding Pass to enable adjustment of its right through an electronic clearance by means of the central computer communications system that emits the airplane Boarding Pass to the companies.
11—Boarding and counting/controlling the number of boarded passengers and to ensure that passengers sit in the allocated seat would automatically be done by passing the passenger coupon parts of the Boarding Passes through writing and reading devices installed at the passenger's seat or any place in the plane.
12—The passenger entry cards to the destination airport would be typed through writing and reading devices connected to a computer and a printer and then the passenger would sign the card to enter the host country.
13—The particulars of the entry card can automatically be circulated from the Boarding Pass through communication equipment from anywhere, either in the plane or at airline offices in the host country.
14—When the passenger disembarks from the airplane he heads for the arrival hall. There are then two possibilities. On the one hand, transit passengers head for the transit hall and associated duty free shops and rests rooms, using the passenger coupon part of the Boarding Pass for access to the transit area. On the other hand, passengers terminating their journey in this airport (the arrival airport) head for the passport offices.

15—Upon descending from the plane and passing towards the exit, the passenger goes to the passport and immigration office in the host country. Instead of writing his particulars and establishing his identification and whether or not he was banned to enter the host country (as in the old system) the same would be done electronically in the new system by passing the passenger coupon part of the Boarding Pass through the reading device to circulate the particulars stored in it to computers of the host country, and to print out and receive an entry card that can be signed and handed in with no need to re-write the particulars of the passenger but needing only a quick check, which saves effort and time.

16—After the passenger has passed the departure point at the destination airport of the host country, he passes to the arrival lounge to collect his luggage.

As aforementioned, dealing with the passenger's luggage needs to be regulated to the satisfaction of the passenger. The passenger's luggage shall be weighed in the usual way and a paper belt prepared, bearing a two or three dimensioned barcode or other identification as well as the airline name, the flight number, the suitcase number and other particulars. The luggage passes by the main conveyor belt where it is sorted by means of a visual or other reader device for the two or three dimensioned barcode. As a result, the whole luggage of each flight passes one way, and the remaining luggage of the other flights continues on its way on the belt until it reaches the next reader device that characterizes whether luggage belongs to another flight. All the luggage will remain on the public belt until sorted, each group of luggage taking a different way depending on the specific flight and airline company.

The reading equipment is characterized by its ability to read two and three dimensioned codes called barcodes and zebra codes.

In the new system, the Boarding Pass would carry the same information in its magnetized strips and/or the storage chips (contact and/or contactless) as on the luggage, where it is carried by magnetic tapes, bar codes, zebra codes or proximity-detectable storage chips.

What is wanted is to sort the luggage in the departure airport according to the flight number and the name of the airline company until all luggage concerning a specific flight is gathered in one place, then the luggage would be carried to the specified plane where it would be stowed on board until the destination airport, then it would be off-loaded in vehicles to the luggage lounge in the arrival airport. What is new in the system is the sorting technique.

The new Boarding Passes can also be used to make a security check that all luggage being boarded corresponds to that of passengers who have checked in and actually boarded the aircraft, i.e. by reading the luggage data on the passenger coupon parts as passengers actually board the plane, and comparing this with the registered luggage data.

At an arrival destination or a transit airport, the passenger can use the passenger coupon part of the Boarding Pass equipped with a magnetic strip and/or a storage chip, to remove or allow removal of his luggage at a place where he is waiting. This relies on a connection between the passenger and his luggage through the magnetic strip and/or the storage chip. Such an arrangement (which is described below in connection with FIG. 17) would decrease the confusion and crowd in front of luggage belts and reduce damage to and loss of luggage that is a big burden to the airline and insurance companies.

This novel luggage sorting system and method is very advantageous with the new Boarding Pass of this invention, but may also be used with other Boarding Passes including conventional Boarding Passes with a single magnetic strip, appropriately programmed.

Characteristics of the Boarding Pass Reading/Writing Devices

The Boarding Pass system includes reading devices or reading/writing devices, that is units or devices installed at different places for reading and processing the new Boarding Passes. These reading/writing devices are characterized by the following:

They have the ability to read and display the original signature stored in an image of letters, symbols and numbers on the magnetized strip itself or stored in the storage chip, which can be stored image ("scanned image") of the signature of the passenger. The Scanned image can also be a thumb or fingerprint or a photograph of the passenger.

The reading/writing device can be connected to a personal computer where the stored information like the signature, image, fingerprint and photograph images can be read and displayed as a means of security. Connection shall be by various methods including direct connection through RS 232 or RS 422 etc or through an internal or external connection or wireless.

This reading/writing device is characterized by the ability to read magnetized strips and/or storage chips (contact and/or contactless) and it can additionally include a personal computer connected with the reading unit. The reading/writing device can be suitable to read contact and contactless types of storage chips.

The reading/writing device would be connected to the below-mentioned sub-server through communication systems allowing such connection.

The new Boarding Pass (of plastic paper or otherwise) is issued with the approval of the airline companies participating in the system according to the invention, and the reading devices will be adapted to the adopted forms of the new Boarding Pass, for example the various embodiments shown in the accompanying drawings and described below.

The reading/writing devices can be fixed or can be hand-held devices, for instance for use on board aircraft. For most locations, it is preferred that the devices will have reading and writing capacity, that is the device can input data for storage in the magnetized strips and/or storage chips and for communication of data via communications systems. Depending on the location, the devices may have a limited writing capacity or limited access via a PIN code, so that certain categories of data cannot be erased or altered by that particular device.

All the above components shall be connected together through an integrated net, forming part of a communications system.

Methods of Making the Boarding Pass with Magnetized Strips and/or Storage Chips on a Thick Portion The Boarding Pass is made of suitable paper, for example by the following method:

The Boarding Pass is made with a rectangle of adequate paper or thin card, in accordance with the standard recognized dimensions in ordinary Boarding Passes, however the new Boarding Pass shall preferably include a thick portion which is in accordance with the standard specifications that suit reader systems to be able to deal with the data reading machines, in particular the standard readers in use at present.

This thick portion will be merged with magnetic strips and/or storage chips, on which the required data and particulars for Boarding Pass will be programmed. Such encoded particulars and information will be invisible but readable by currently available readers.

As for the balance area of the Boarding Pass carrying the visible printed data, this will be of thin ordinary writing paper on the face of which the ordinary particulars of the Boarding Pass will be printed as per the drawings (see below), including passenger and travel data important for meeting the aims of the invention or any other data important for the airline companies, for security purposes, for the traveler, and for service companies participating in the system. The paper will be writeable by writing or computer printing in the appropriate spaces visible data that corresponds at least in part to encoded data stored in the magnetized strips or storage chips.

For example, the Boarding Pass is made by the following steps:

1—The thick portions of the Boarding Pass have a magnetized strip and/or storage chip (contact and/or contactless) merged with any appropriate paper or made from any suitable material, whose dimensions and thickness are in accordance with the required standard specifications allowing writing and reading through standard readers/writers. The storage chips can be contact and/or contactless chips.

2—The boarding passes carry all the required particulars mentioned in the description or illustrated in the drawings and any other information necessary for the airline companies, for security, for the traveler, or for service companies participating in the system, and information related to airline companies and traveler services such as hotels and tourist companies. Further, the same particulars on the front face of the Boarding Pass are stored on the magnetized strip and/or storage chips so that they are invisible but readable by suitable readers.

3—The rear paper face (the back leaf) of the Boarding Pass is left for writing any additional required data. If the magnetized strip and/or storage chip is merged on the back side of the Boarding Pass, the same will be near one of the sides which is allotted to merge the strip and that has a thickness suitable for the readers and is alongside sides allotted for the stored encoded data.

4—The magnetized strips and/or storage chips may be merged on the rear face of the Boarding Pass near one of the sides with dimensions suit the current readers, so it can be easily read with available systems.

5—Also the magnetized strips and/or storage chips may be merged in any suitable place of the Boarding Pass other than those mentioned above.

The Boarding Pass with its storage chips and/or magnetized strips is made of any suitable type of plastic and paper or any other suitable material, in accordance with the recognized dimensions of ordinary conventional Boarding Passes, or any required dimensions. Magnetized strips and/or storage chips are merged on the thick portion so that it will be difficult to separate and remove them, while the thick part allotted for the strip/chip will have an area and thickness suitable for the readers/writers. The remainder of the Boarding Pass is preferably thinner, namely of the ordinary thickness of standard known boarding passes.

The thick portion will be merged with paper ply by any method of calendaring/pressing (i.e. thermal lamination), and the storage chip and/or magnetized strip will usually be uncovered.

For instance, the thin portion can have the usual thickness of a standard boarding card, and the thick portion can be several times thicker while remaining compatible with the standard reading devices, say from 1.5 to 5 times as thick, conveniently about 2 to 3 times as thick. In special cases, the Boarding Pass can be of uniform thickness.

The storage chip (or the magnetized strip merged in a thickened portion) provides the possibility to record and store a large quantity of particulars, whether such particulars, data and information are magnetized, coded, or ciphered as required, and whether they are pictures, particular information, or codes.

Furthermore, it is possible through these magnetized strips and/or storage chips to ensure the soundness and reliability of these Boarding Passes, and to provide correspondence of their particulars with those printed on the Boarding Pass, as well as secure processing thereof. They also enable checking of all the particulars of the traveler, the Boarding Pass, and the signature, the photograph or the thumb impression to confirm the soundness and correctness of these Boarding Passes. Also these magnetized strips and/or storage chips of high storage capacity avoid the traditional defaults of standard known Boarding Passes.

It is possible to make a Boarding Pass with magnetized strips and/or storage chips by other methods, for example: the paper of the Boarding Pass may be made from paper merged with a plastic portion with standard specifications in accordance to the reading/writing devices, or other means could be used to fix the magnetized strips and/or storage chips. A plastic portion could be fixed on the upper side of the Boarding Pass or on the bottom. This plastic portion could be fixed in any suitable place on the Boarding Pass that is suitable for the reading/writing devices. Reference is made to the drawings as non-limiting examples.

The Method of Writing and Reading the Storage Chip

FIGS. 12-D, 12-A and 12-B illustrate the principle of a method for writing and reading stored encoded data in the storage chip in general, as is known from U.S. Pat. No. 6,112,997. In these Figures, reference numeral 31 indicates a plastic Boarding Pass with a microchip module 33. On the surface of the plastic chip, in the region of the microchip modules 33, eight contacts 40, 41, 42, 43, 44, 45, 46, 47 are mounted and connected electrically conductively to the microchip. They serve to provide electrical contact with eight corresponding fixed counter contacts 50, 57 of a plastic Boarding Pass reader that has a slot for receiving the plastic Boarding Pass 31. In FIGS. 12-A and 12-B the electrical contacting of the first and eighth contacts 40 and 47 of the plastic Boarding Pass 31 with the first and eighth counter contacts 50 and 57 of the plastic Boarding Pass reader is shown. The counter contacts 50, 57 are electrically conductively connected to a microprocessor 60A of the reader. The contacts 40, 47 on the surface of the plastic Boarding Pass 31 are arranged such that two contacts each in the insertion direction, indicated by an arrow, and four contacts each crosswise to the insertion direction are disposed side by side. In FIGS. 12-A and 12-B, the plastic Boarding Pass 31 is introduced lengthwise into the Boarding Pass slot of the Boarding Pass reader. However, it is also conceivable for the plastic Boarding Pass 31 to be introduced widthwise into a corresponding Boarding Pass slot. In that case, the arrangement of the contacts 40, 47 on the surface of the plastic Boarding Pass 31 would have to be rotated by 90 Degree from what is shown in FIGS. 12-A and 12-B. It does not matter hereinafter whether the plastic Boarding Pass 31 is to be introduced into a slot lengthwise or widthwise, since the disposition of the contacts 40, 47 in the insertion direction is always the same. By means of the electric contacting of the contacts 40, 47 with the corresponding counter contacts 50, 57, writing and/or reading operations on the microchip of the Boarding Pass 31 are possible with the aid of the microprocessor 50.

FIG. 12/C illustrates an embodiment of a reader with two paths for reading magnetized strips and storage chips, as described below. The new Boarding Passes can however be used with any other suitable reading/writing devices.

Thus, the new Boarding Pass system and methods of processing the Boarding Pass are able to confirm the correctness and integrity the Boarding Pass, and to immediately discover any illegal changes.

The storage chip and/or magnetized strips merged on the thick portion of the Boarding Pass could be merged in any suitable place on the front or rear side of the Boarding Pass. The thickness and specification of the Boarding Pass in the merged area with the storage chip and/or magnetized chip should be accordance to the specific standard of the reading/writing devices.

The Boarding Pass can incorporate normal storage chips or Proximity contact chips, or both, and be read/encoded using standard reading/writing devices suitable for these chips.

BRIEF DESCRIPTION OF THE DRAWINGS

The drawings show, by way of non-limiting example, several embodiments of the Boarding Pass according to the invention, and associated equipment. In the drawings:

FIGS. 12-A and 12-B illustrate the method of reading and writing of a storage chip in detail.

FIG. 12/C is a perspective view of a device for reading the magnetized strips and storage chips.

FIG. 12-D illustrates the method of reading and writing of a storage chip in general.

DETAILED DESCRIPTION

Figure 1:
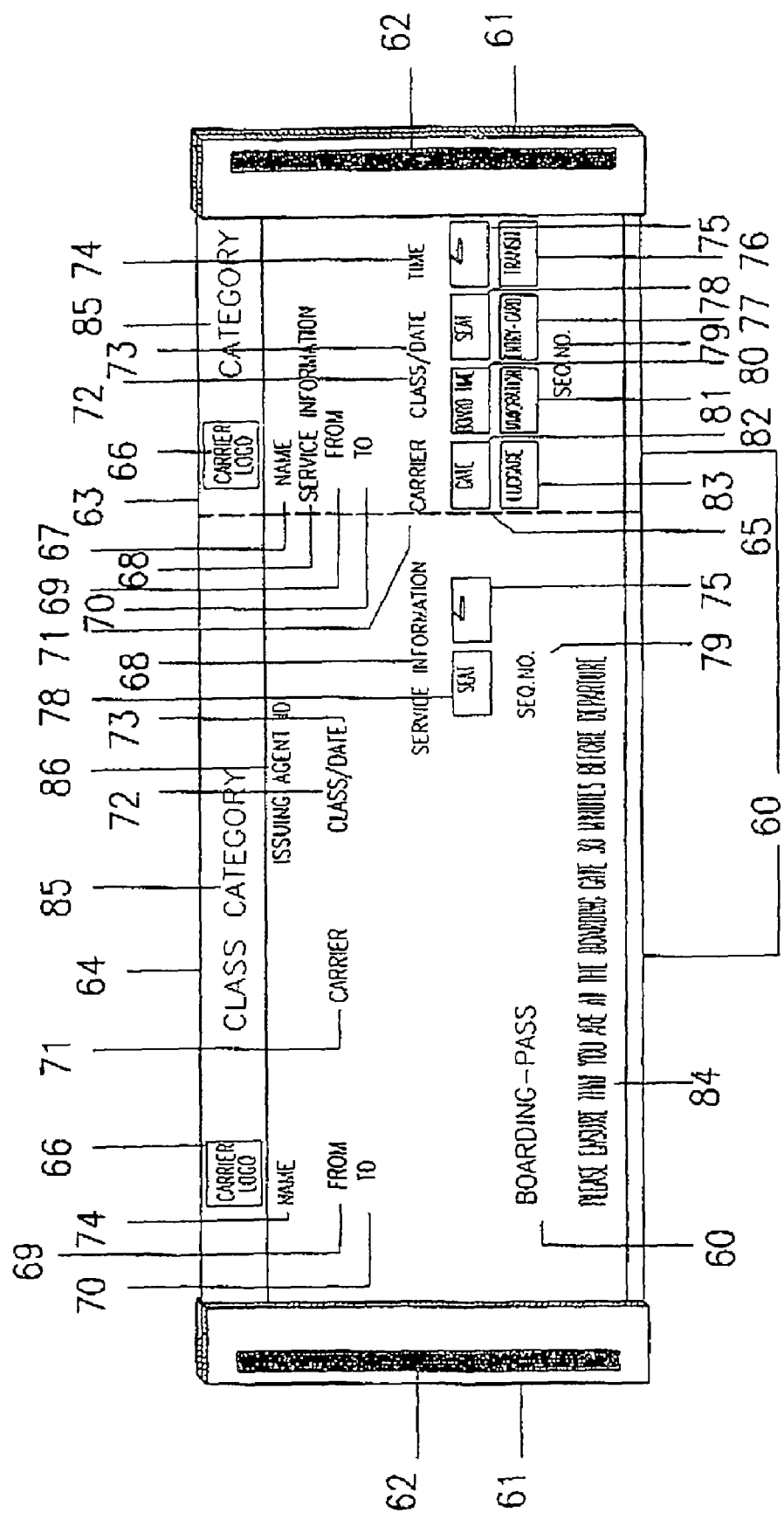
FIG. 1 shows a first type of Boarding Pass according to the invention, viewed from its front face.
Figure 2:
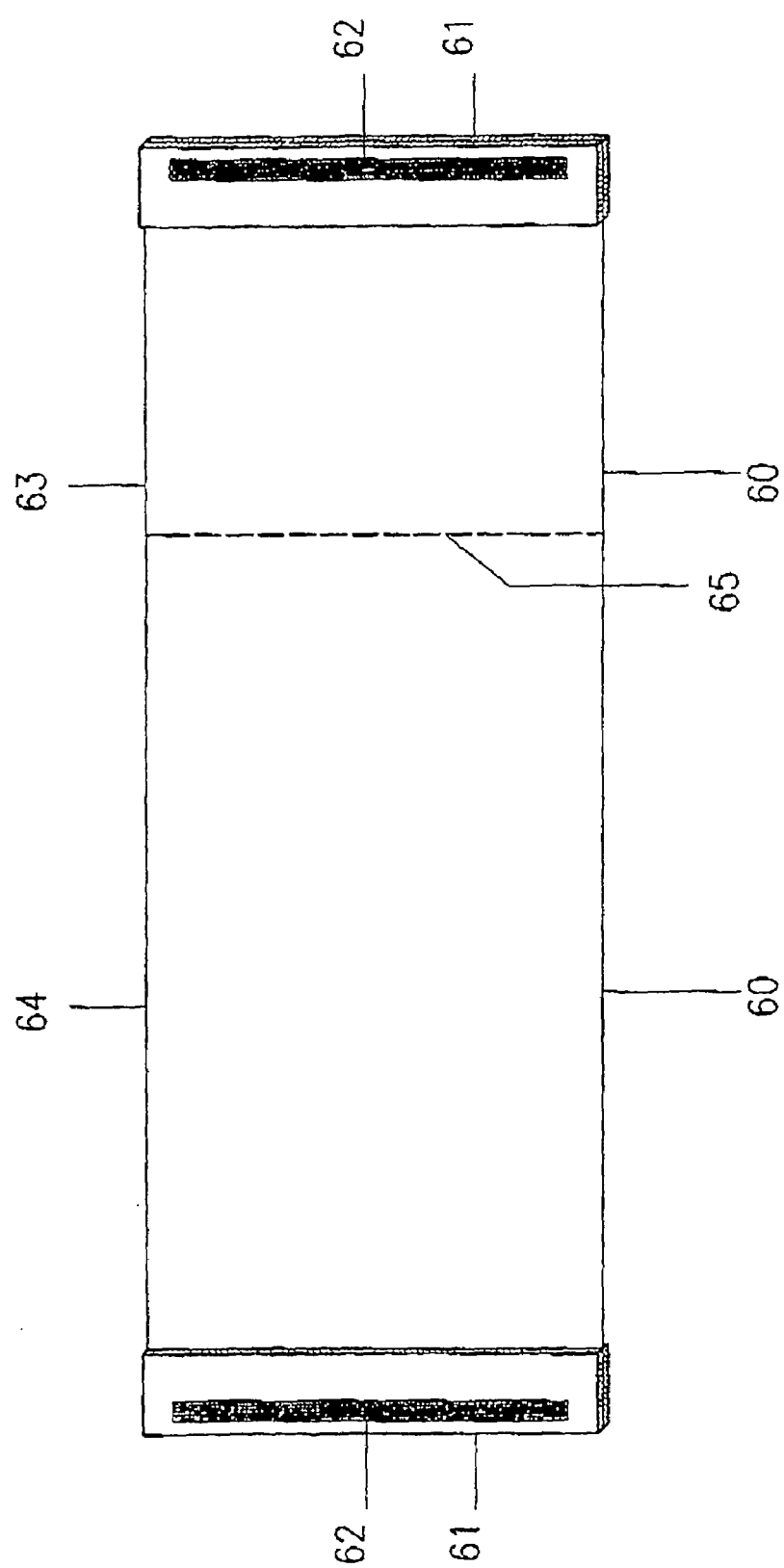
FIG. 2 shows the rear face of the Boarding Pass of FIG. 1.

The Boarding Pass 60 illustrated in FIGS. 1 and 2 consists of two parts, a passenger coupon part 63 and a main coupon part 64. The Boarding Pass 60 is generally rectangular and made from special paper suitable for writing/printing. On its opposite narrow edges it has two thick portions 61 made of plastic or any other material each with a merged magnetized strip 62. As shown, these thick portions 61 are situated on the right side of the passenger coupon part 63 and the left side of the main coupon part 64. The thick portions 61 are for example generally rectangular and are merged inside with the thin paper portion of the Boarding Pass, carrying on one or both of its sides a magnetized strip 62.

The magnetized strips 62 fixed on the thick plastic portions 61 carry the required magnetized information stored in the Boarding Pass, as described elsewhere; also it is possible to load entry card information thereon.

FIG. 2 shows the perforated line 65 that divides the main and passenger coupon parts of the Boarding Pass, illustrating the possibility to fix the magnetized strip 62 on the thick portion 62 from the front and rear sides. If required, the magnetized strips 62 are on one side only.

As shown in FIG. 1, the front face of the Boarding Pass 60 carries printed indications and has corresponding spaces for printing data. The printing/data on the front face includes, at appropriate locations and where appropriate duplicated on the passenger coupon part 63 and on the main coupon part 64: a carrier logo 66; the passenger name 67; service information 68; the departure airport 69; the arrival airport 70; the carrier (airline company/flight number) 71; the travel class 72; the departure date 73; the scheduled departure time 74; smoking or non-smoking passenger 75; transit details 76; entry card requirements 77; seat 78; serial number 79; the boarding time 80; security counter 81 for immigration and passport data; the departure gate number 82; luggage information 83; a notice 84 to inform the passengers to be at the departure gate 30 minutes before departure; an indication of the class/category 85; and the issuing agency 86. Corresponding data is encoded and stored in the magnetized strips 62.

As shown, part of this information is pre-printed on the front face of the Boarding Card that has spaces for printing further data, in particular data printed in correspondence with encoded data stored in the magnetized strips 62 (or storage chips). The printed information appears on the thin portion of the Boarding Card 60. The thick portions 61 in principle have no printed information, or only permanent printing (like a logo), but normally not data that is printed in correspondence with the encoded data.

The above-mentioned information is given as example and is not exhaustive. It is possible to add any necessary data for the passenger, security, airlines companies, and service companies relating to airlines industry, and by using the insurance number of the passenger, all such information could be printed on and/or be readable from the Boarding Pass, stored into the magnetized strip and/or storage chip merged into the Boarding Pass.

In the following drawings of different Boarding Cards 60, the same reference numerals are used to designate the same elements and data, which will not be repeated.

Figure 3:
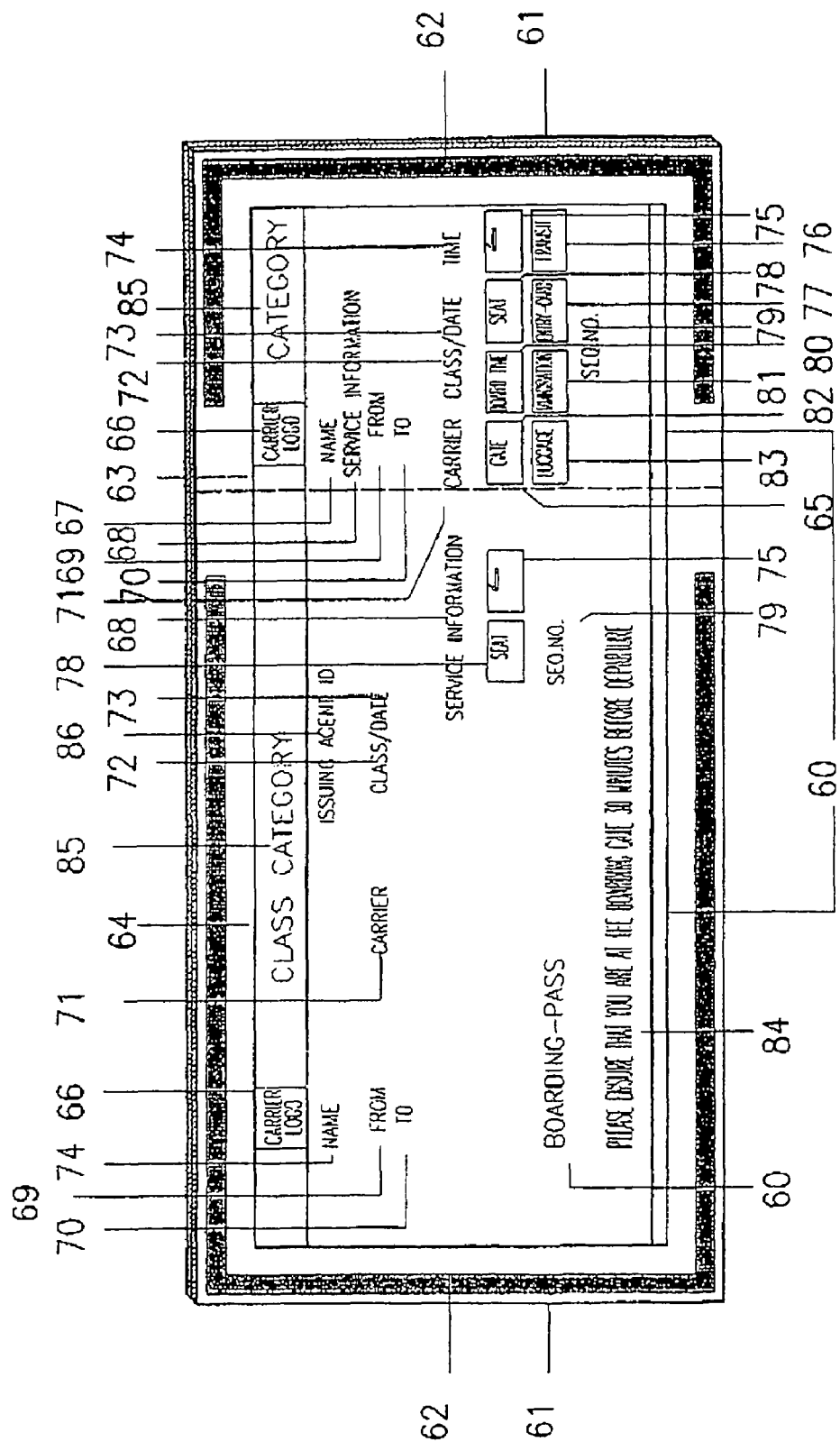
FIG. 3 shows another Boarding card with magnetized strips around part of its periphery.
Figure 4:
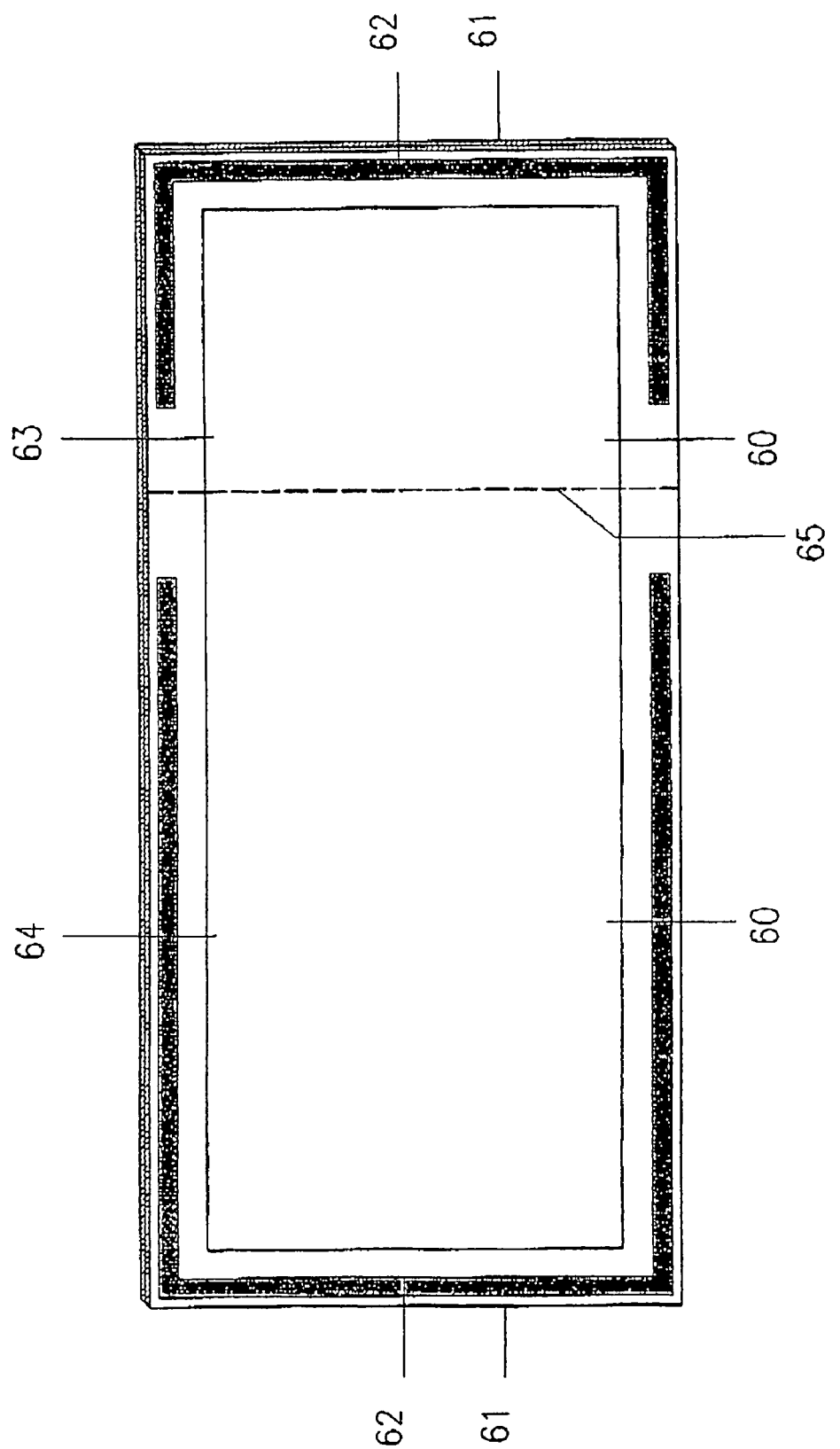
FIG. 4 shows the rear face of the Boarding Card of FIG. 3.

FIGS. 3 and 4 show another Boarding Card 60 having magnetized strips 62 that extend around a major part of the perimeter of the Boarding Card, but excluding the zone in the vicinity of the perforated line 65. These magnetized strips are located on a thick plastic portion 61 that extends all the way around the perimeter, including over the perforated line 61. Generally, the magnetized strips 62 can be located at any locations on the passenger coupon part 63 and the main coupon part 64 that are convenient for recording/reading the strips, but avoiding the perforated line 65. For instance, the magnetized strips could extend on only the top or bottom edges. The thick portions 61 can correspond more or less exactly to the position and dimensions of the magnetized strips 62, or can extend over a greater area.

Figure 5:
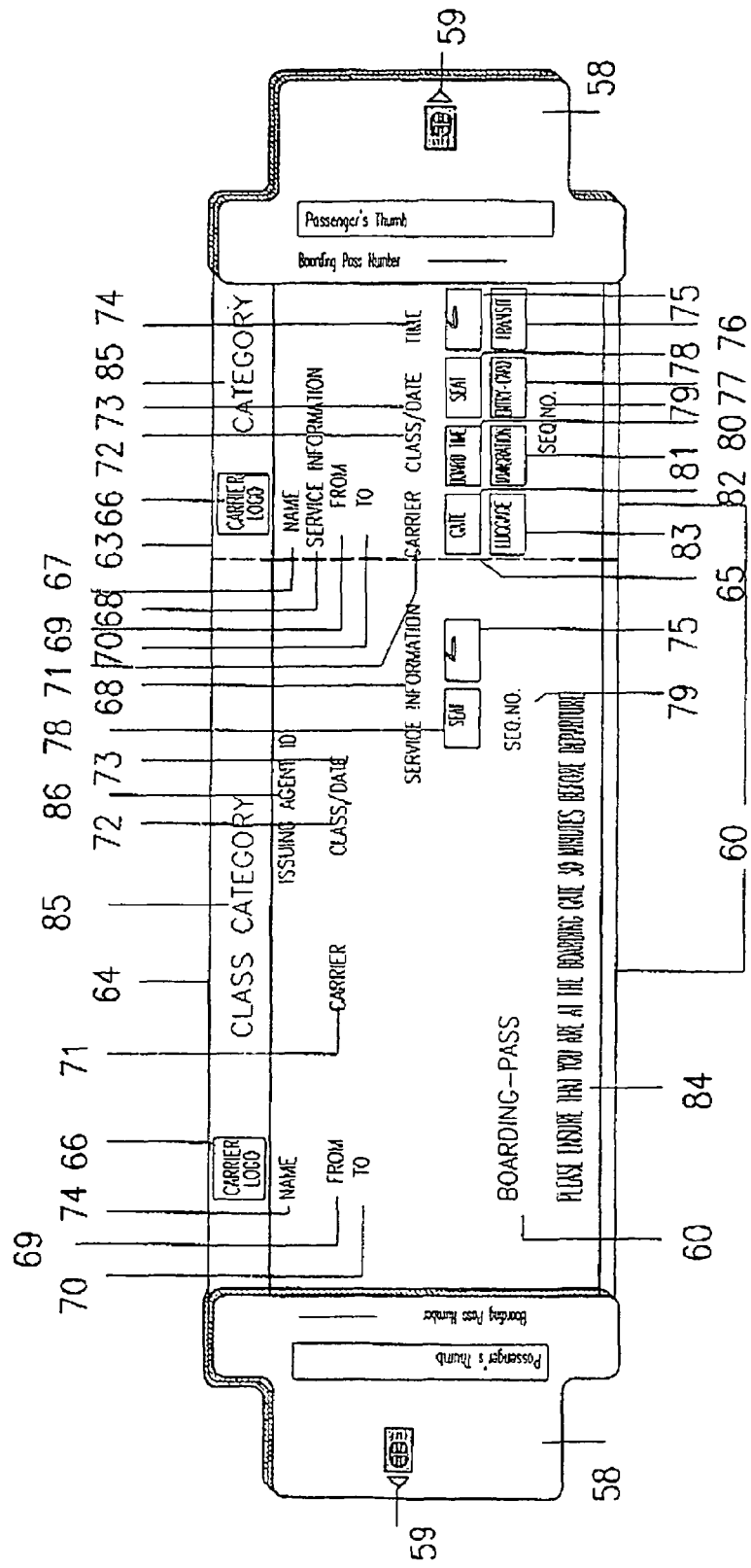
FIG. 5 shows another Boarding Pass having thick portions of "winged" shape.

FIG. 5 shows another embodiment of Boarding Card having thick portions 58 of "winged" shape in which storage chips 59 are merged. These thick portions 58 are attached to the opposite ends of the Boarding Pass 60, one to the right hand end of the passenger coupon part 63, the other to the left hand end of the main coupon part 64. At their point of connection, the winged thick portions 58 have the same width as the narrow edges of the boarding pass 60. The storage chips 59 are merged in a narrower protruding part or tab at a convenient location for reading/writing. This allows easier fixing of the storage chips 59 on the thick parts 58 and facilitates insertion thereof in a reading/writing device. The specifications of the thick portion 58 and storage chips 59 are suitable for standard reading/writing devices.

Figure 6:
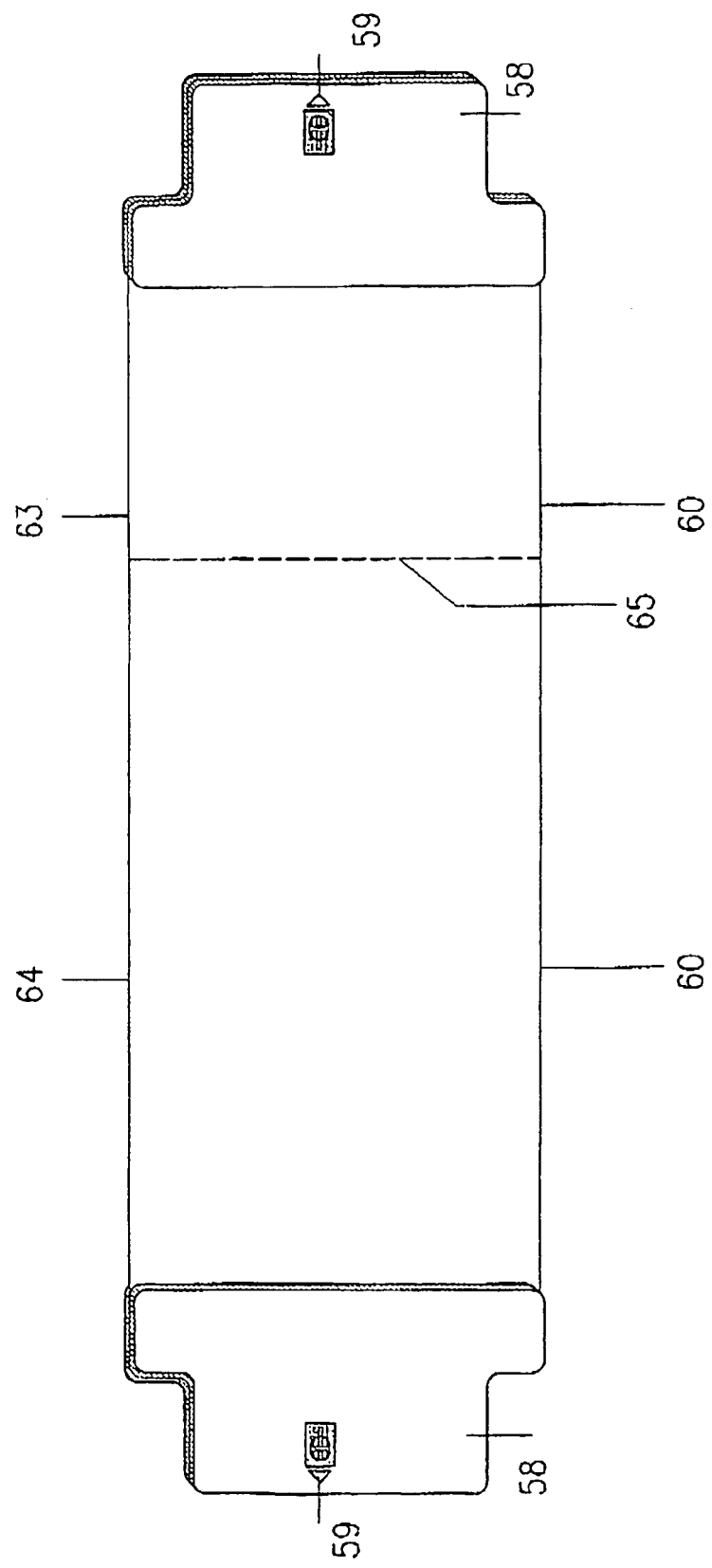
FIG. 6 shows the rear face of the Boarding Card of FIG. 5.

Further, as illustrated by FIG. 6, the winged thick portions 58 and storage chips 59 can be fixed on the Boarding Pass portions from the rear or front side, or as shown the thin portion of the Boarding Pass can be merged in the middle of the thick portions 58.

Figure 7:
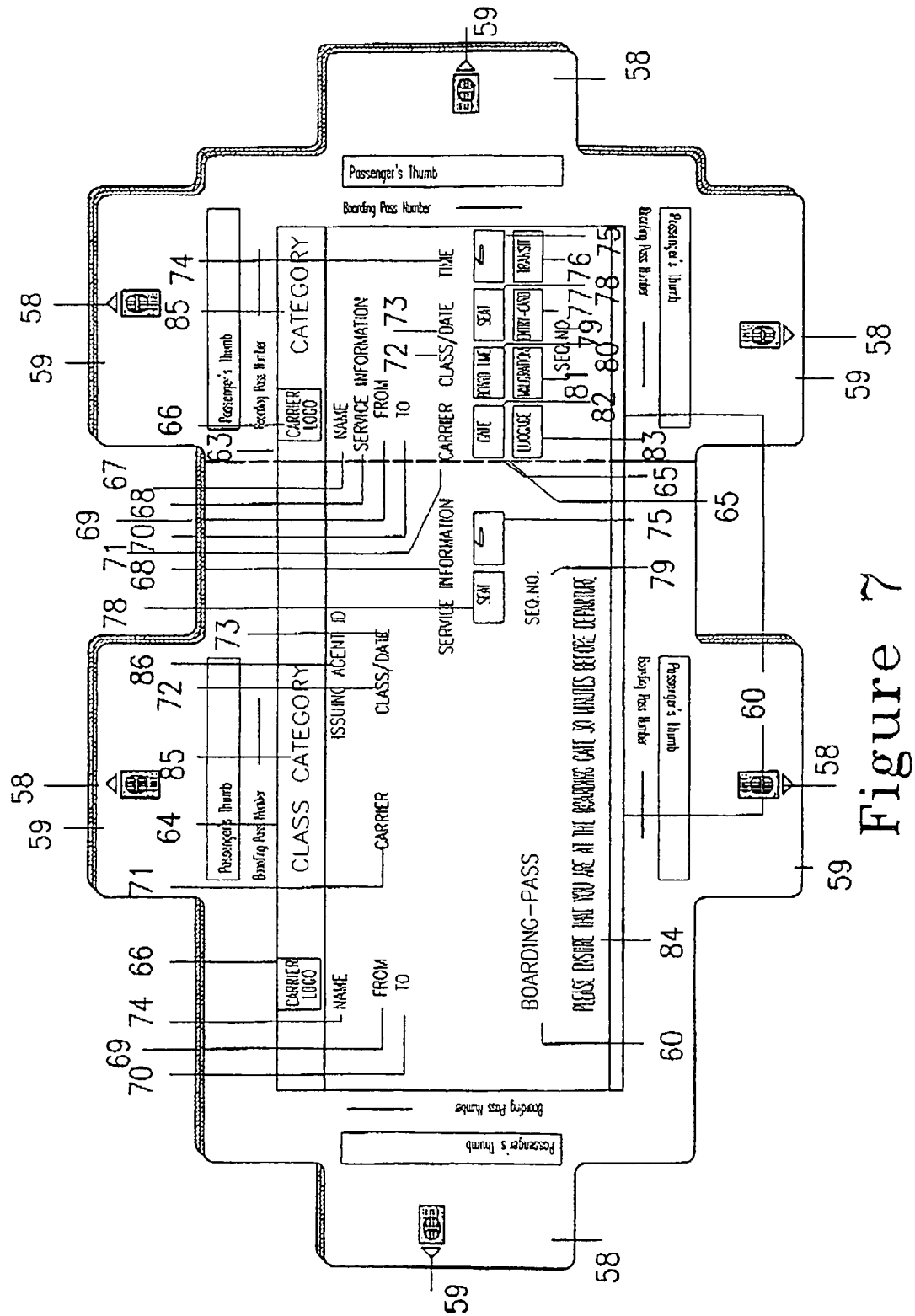
FIG. 7 shows another Boarding Pass showing the possibility of having "winged" thick portions protruding from any side of the Boarding Pass in different positions.

FIG. 7 shows a further type of Boarding Card 60 illustrating several possibilities for including thick portions 58 of "winged" shape protruding from different parts of the periphery of the Boarding Card at locations suitable for the reader/writer devices, on the two parts 63, 64 of the Boarding Pass with the possibility of fixing the storage chips 59 into the thick wing portions 58 from the front or rear side according to the standard of the reader and writer devices.

Figure 8:
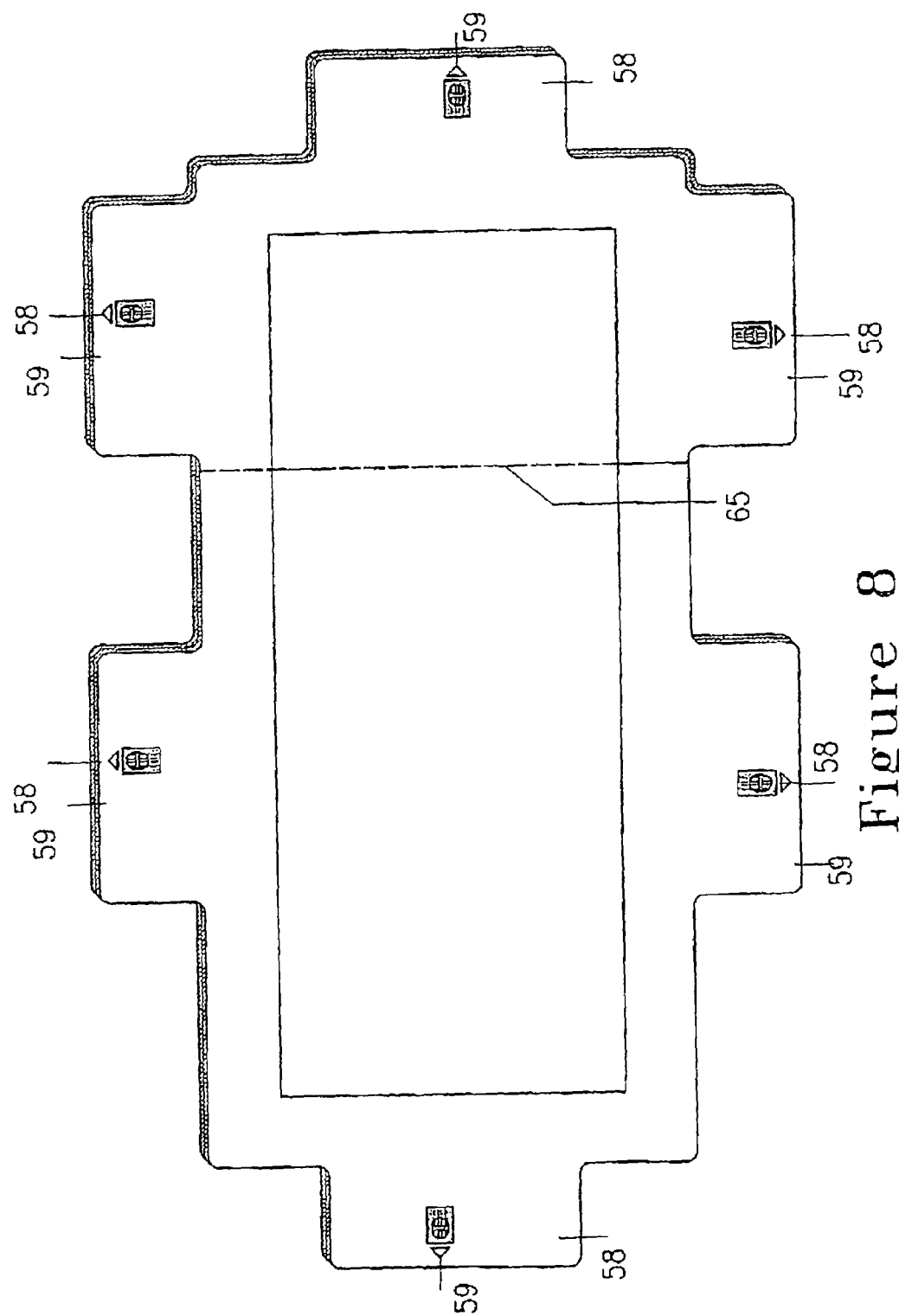
FIG. 8 shows the rear face of the Boarding Card of FIG. 7.

FIG. 8 illustrates the two parts of the same Boarding Pass 60 from the rear side with a suitable design of the thick winged portions 58 to fix the storage chips, the specification of the thick portions 58 and storage chips 59 according to the standard of the reader and writer devices. As shown, the storage chips 59 can be placed on the front and/or rear side of the two parts 63, 64 of the Boarding Pass 60, in any suitable place on the Boarding Pass. Such Boarding Pass will have at least two thick parts 58 with storage chips 59 at any of the given locations of the Boarding Pass. As shown in FIG. 8, the thick part can extend around the periphery of the Boarding Pass, even if there are only two thick portions 58 with storage chips. Alternatively, the thick part 58 can extend along only those edges provided with storage chips 59. Other shapes and locations for the thick parts 58 are possible.

Figure 9:
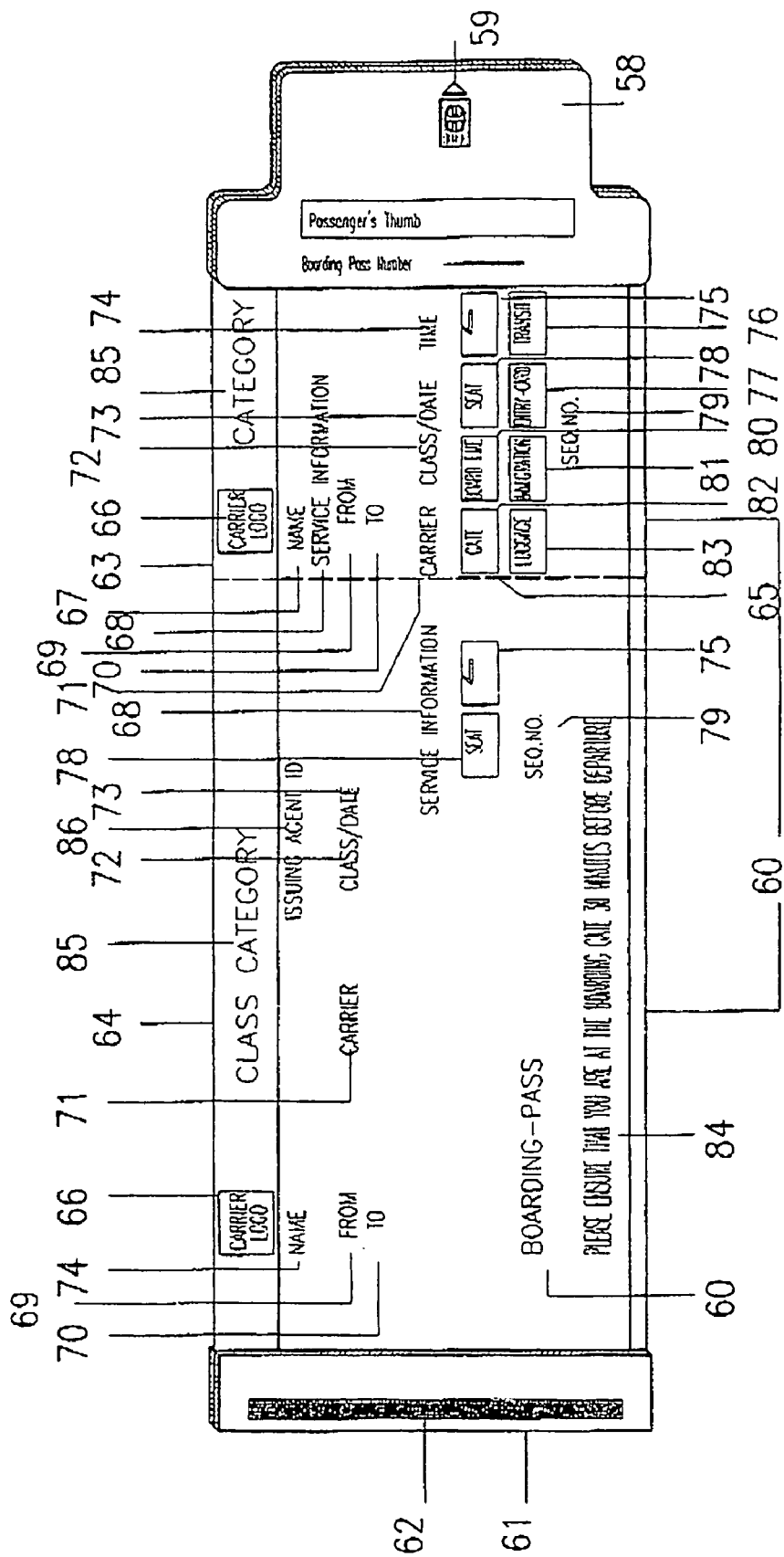
FIG. 9 shows a Boarding Pass with a magnetized strip at one end on the main coupon part and a storage chip at the other end on the passenger coupon part.
Figure 10:
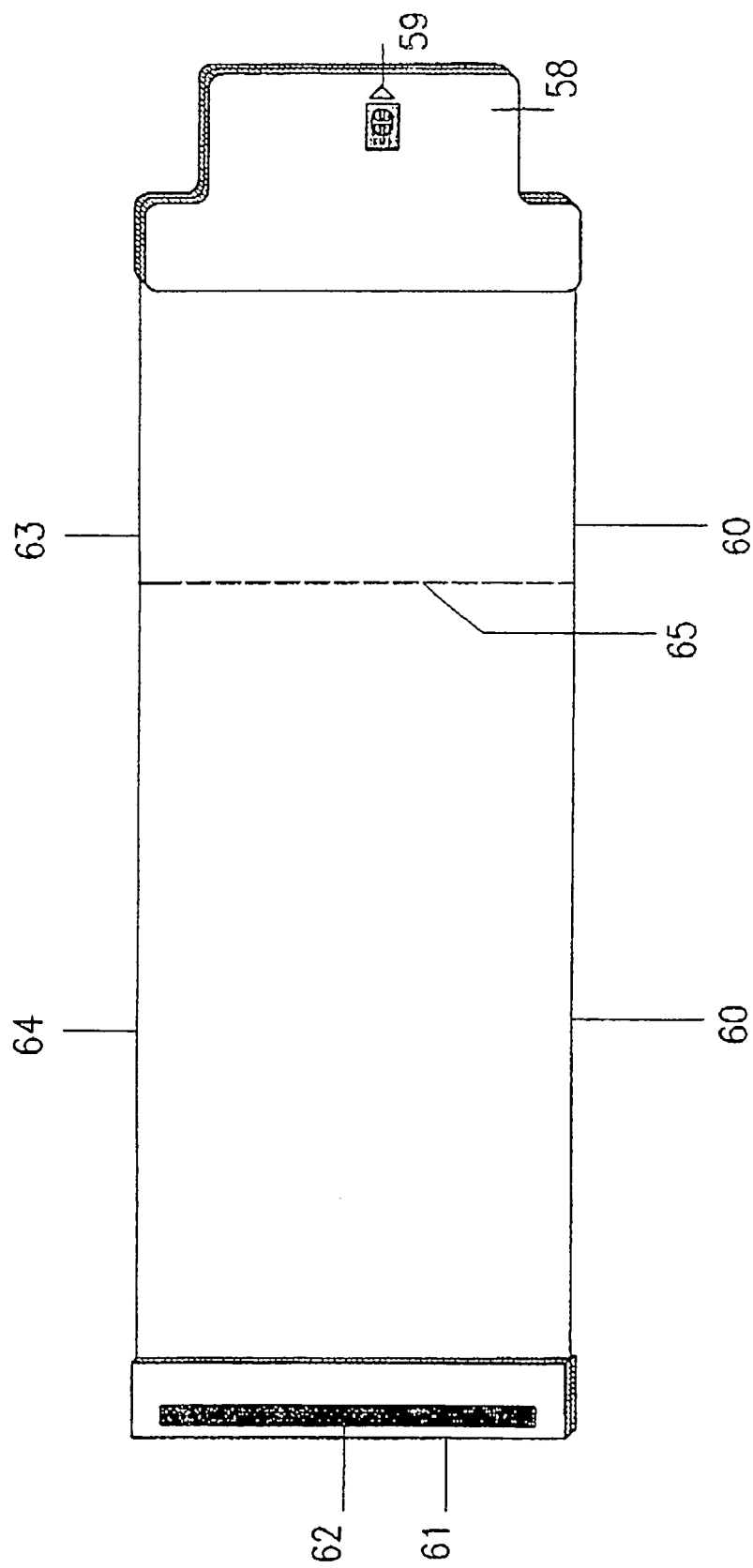
FIG. 10 shows the rear face of the Boarding Card of FIG. 9.

FIGS. 9 and 10 show another Boarding Card illustrating the possibility of using both a storage chip 59 and a magnetized strip 62 on different parts of Boarding Pass, namely in this example a thick rectangular part 61 and magnetized strip 62 on the end of the main coupon part 64, and a winged thick part 58 with storage chip 59 on the end of the passenger coupon part 63. These thick parts and magnetized strips or storage chips could however be attached to any location of the respective parts of the Boarding Card suitable for the reader/writer devices. FIGS. 9 and 10 show usage of the magnetized strip 62 and storage chip 59 respectively from the front and rear side of the Boarding Pass, it being understood that reading and writing may be possible from either or both faces.

Figure 11:
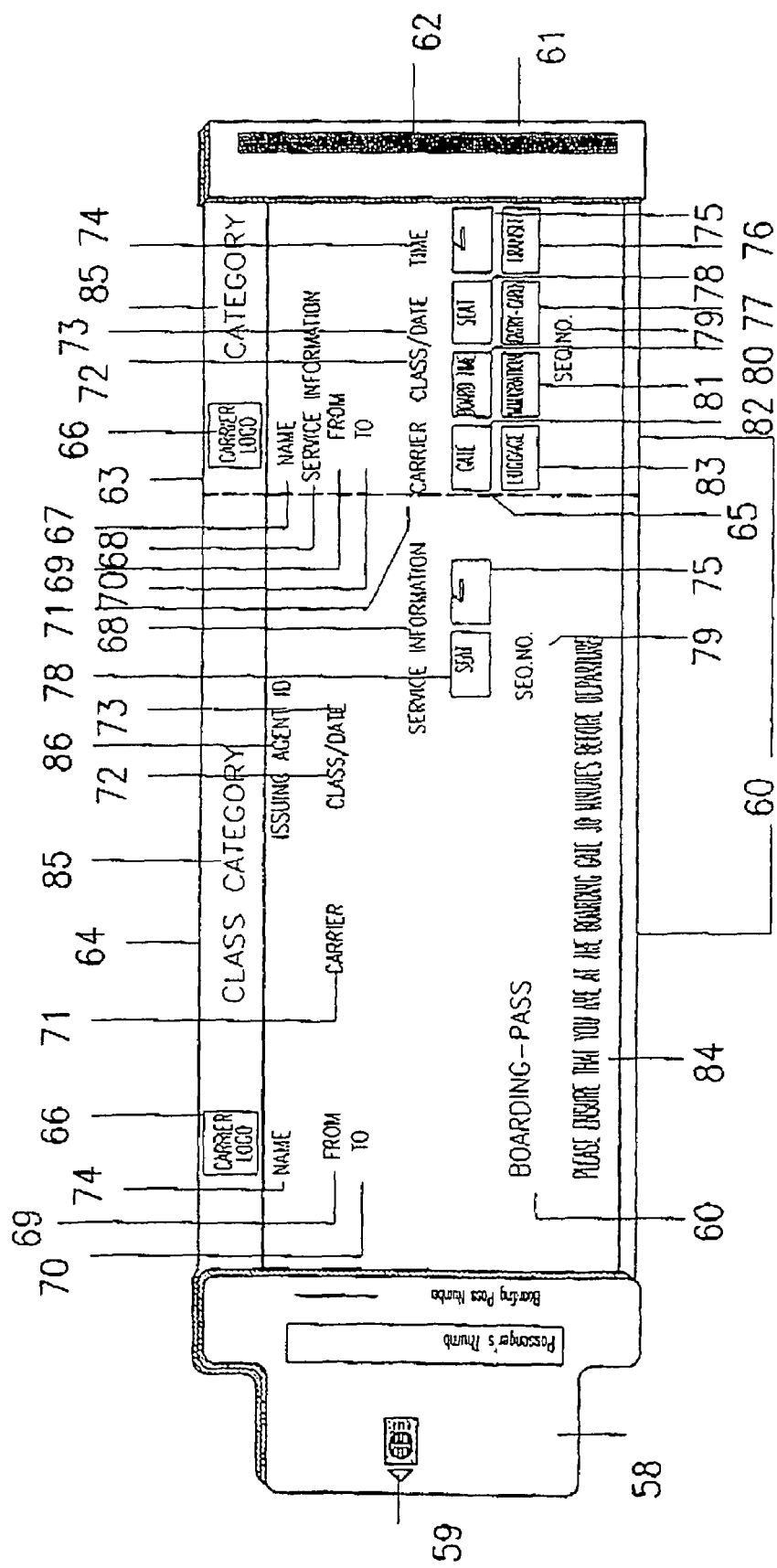
FIG. 11 shows a Boarding Pass with a magnetized strip at one end on the passenger coupon part and a storage chip at the other end on the main coupon part.
Figure 12:
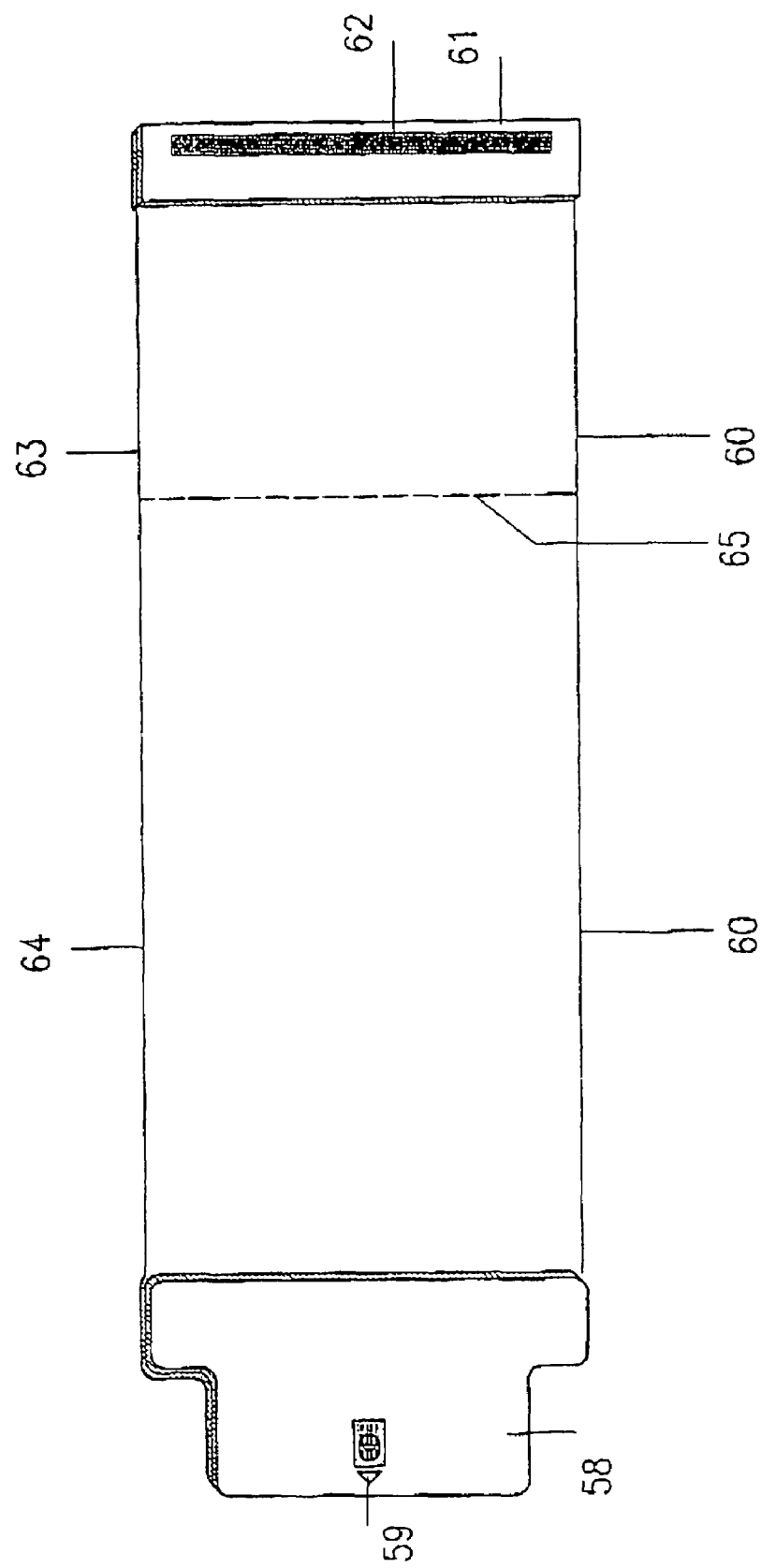
FIG. 12 shows the rear face of the Boarding Card of FIG. 11.
Figure 12D:
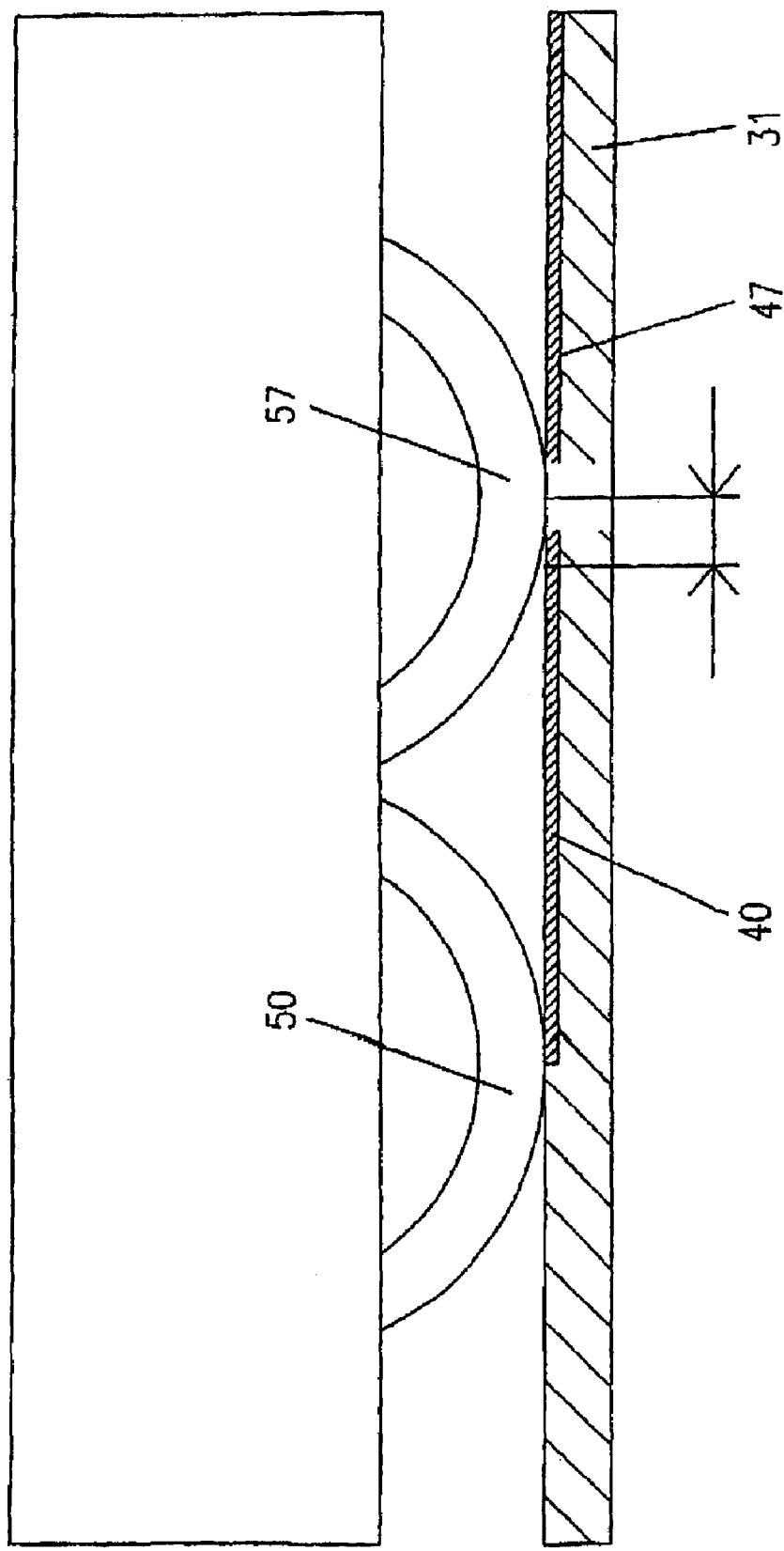

FIGS. 11 and 12 show another Boarding Card illustrating the possibility of using both a storage chip 59 and a magnetized strip 62 on different parts of Boarding Pass, namely in this example a thick rectangular part 61 and magnetized strip 62 on the end of the passenger coupon part 63, and a winged thick part 58 with storage chip 59 on the end of the main coupon part 64. As before, these thick parts and magnetized strips or storage chips could be attached to any location of the respective parts of the Boarding Card suitable for the reader/writer devices. FIGS. 11 and 12 show usage of the magnetized strip 62 and storage chip 59 respectively from the front and rear side of the Boarding Pass, it being understood that reading and writing may be possible from either or both faces.

FIG. 12/C is a perspective view of a reader 61A for the Boarding Passes. Currently, there are available on the market devices which can read magnetic strips the electronic storage chips possibly through passages and openings 65A, 66A as per the illustration of FIG. 12/C. The reader 61A also has a keypad 62A, a display 63A and a print-out 64A. These device and others can be used to read a Boarding Passes equipped with magnetic strips only as in FIGS. 1, 2, 3 and 4 or equipped with storage chips only as per the FIGS. 5, 6, 7 and 8, or Boarding Passes equipped with a magnetic strip and a storage chip as per FIGS. 9, 10, 11, 12, 13, 15 and 16, on condition that the Boarding Pass shall be adapted to the reading devices and both shall be as per the standard specifications. The type of reader shown in FIG. 12/C can be portable or fixed and could for instance be used for reading the Boarding Pass at a point of sale; the same or different designs of readers could be used at baggage check-in, passenger embarkation and other points of transit. Preferably the device will be a combined reading/writing device.

Figure 13:
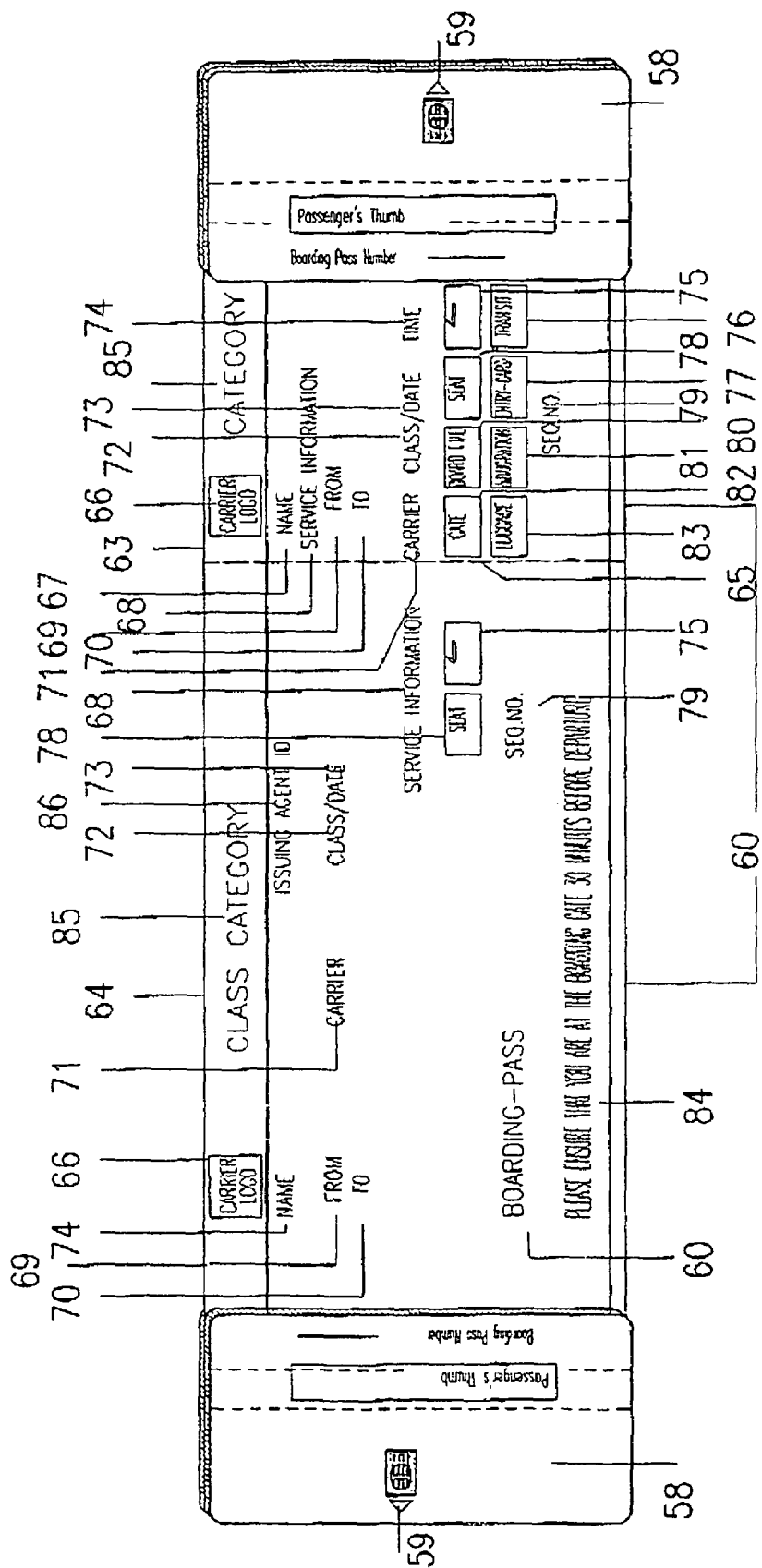
FIG. 13 shows a Boarding Card having thick parts with storage chips at both ends.

FIG. 13 illustrates another Boarding Pass with a storage chip 59 on the two parts of the Boarding Pass, namely the main coupon part 64 and the passenger coupon part 63, the storage chips 59 being merged in thick parts 58 which are generally rectangular with rounded edges, i.e. without using the winged design with a protruding tab. Other shapes of the thick portions 58 are possible. The storage chips 59 are located on parts of the rectangular thick portions protruding from the respective ends of the Boarding Pass 60, for easy engagement with reading/writing devices.

Figure 14:
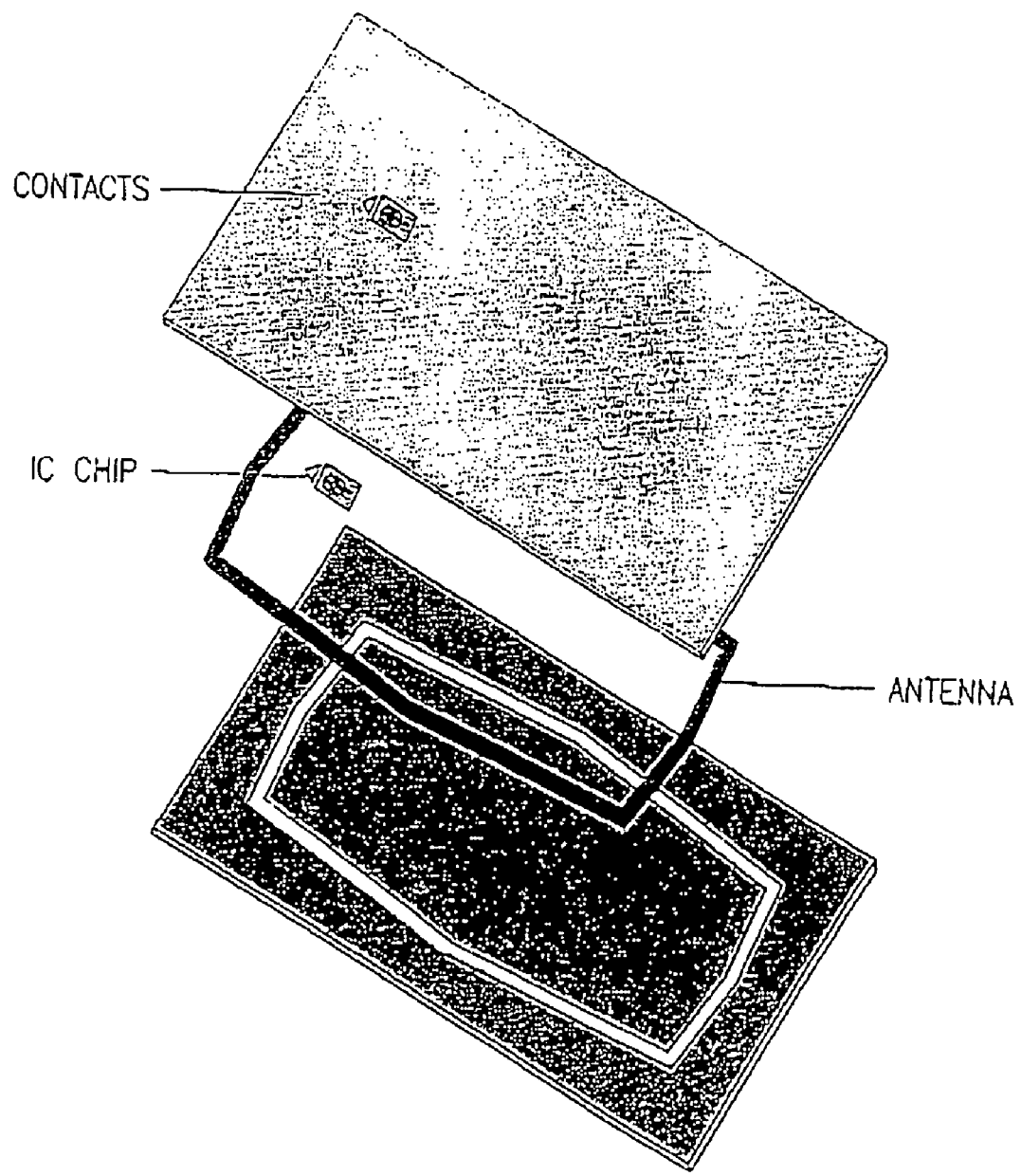
FIG. 14 is an exploded perspective view of a dual-purpose card (contact and contactless).

FIG. 14 is an exploded perspective view of a proximity (or "prox") card showing the merged circuit or IC Chip that cooperates with contacts and has an integrated loop antenna for contactless operation. Such card is a "dual interface" card that operates in both contact and contactless modes and can be incorporated into Boarding Passes according to the invention, as well as possibly also in luggage identification tabs.

Figure 15:
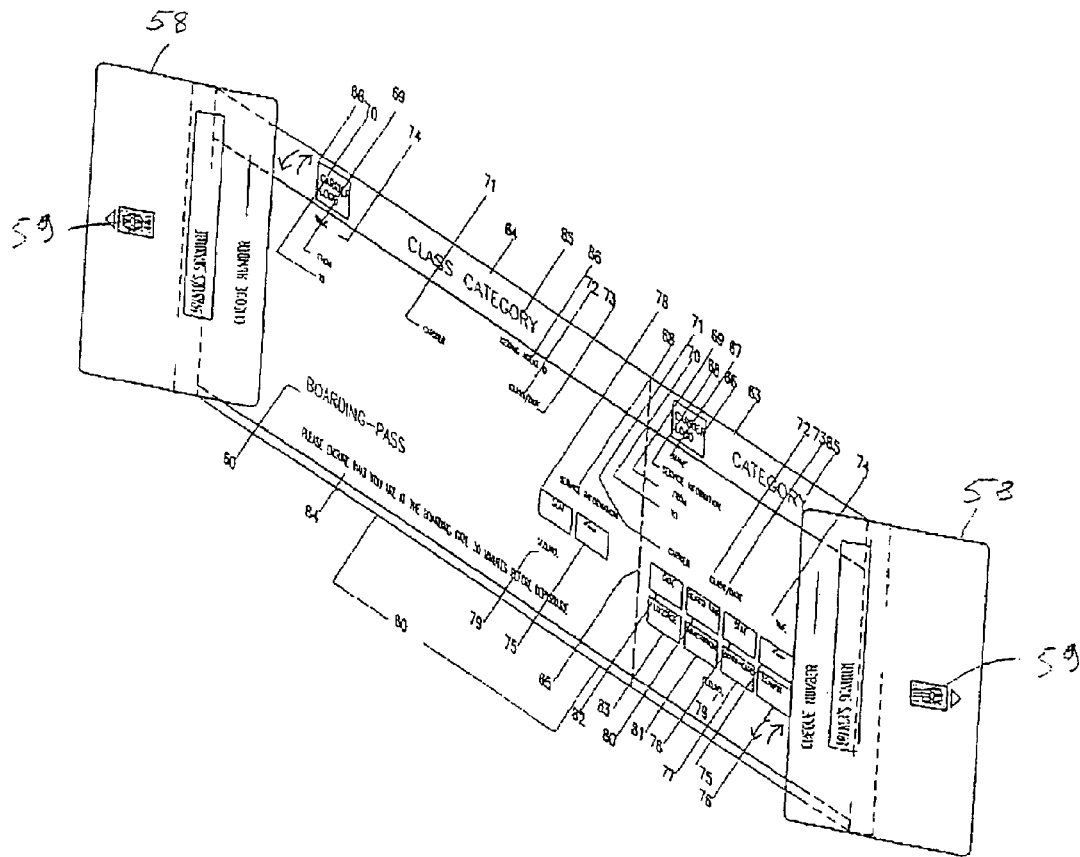
FIG. 15 shows a Boarding Card having thick parts with storage chips inclinably mounted at both ends.

FIG. 15 illustrates another type of Boarding Card 60 having generally rectangular thick portions 58 that are inclinably attached to the opposite ends of the Boarding Card 60, one inclinable thick portion 58 is attached to the passenger coupon part 63 and the other inclinable thick portion 58 is attached to the main coupon part 64. In FIG. 15, the storage chips 59 are on the parts of the thick portions 58 that protrude from the ends of the Boarding Pass 60 when the thick portions 58 lay flat against the Boarding Pass or are slightly inclined, as illustrated. In this way, the storage chips 59 on the protruding parts can easily be engaged with reading/writing devices, the user gripping the other, inner edge of the thick par 58.

Figure 16:
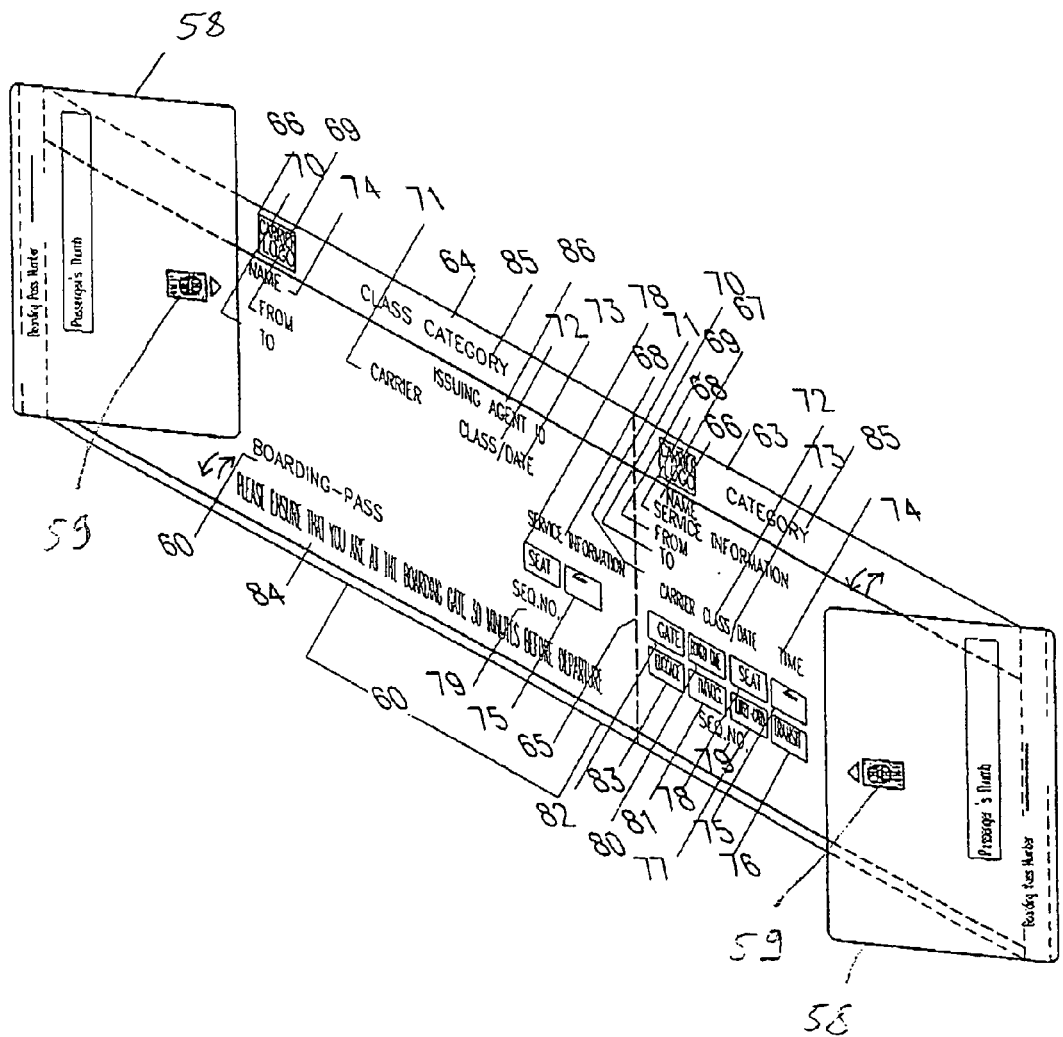
FIG. 16 shows another Boarding Card having thick parts with storage chips inclinably mounted at both ends.

FIG. 16 illustrates another Boarding Pass 60 that has inclinable thick portions 58, like in FIG. 15, but in this case the storage chips 59 are on the parts of the thick portions 58 that lie over the Boarding Pass 60, or point inwards, when the thick portions 58 lay flat against the Boarding Pass 60 or are slightly inclined, as shown. To insert the storage chips 59 of this Boarding Pass 60 into a reading/writing device, the user grips the narrow outer edge of the respective thick portion 58, inclines it relative to the Boarding Pas 60, and places the part of the thick portion 58 with the storage chip 59 in the reading/writing device.

As illustrated in FIGS. 15 and 16, such inclinable thick portions can be attached to the ends of the passenger coupon part 63 and the main coupon part 64 at different points of attachment allowing different possibilities for inclining the thick portions. Also, the generally rectangular inclinable thick portions of FIGS. 15 and 16 could be replaced by "winged" shapes, for example as shown in FIGS. 5 to 12, or other shapes.

Figure 17:
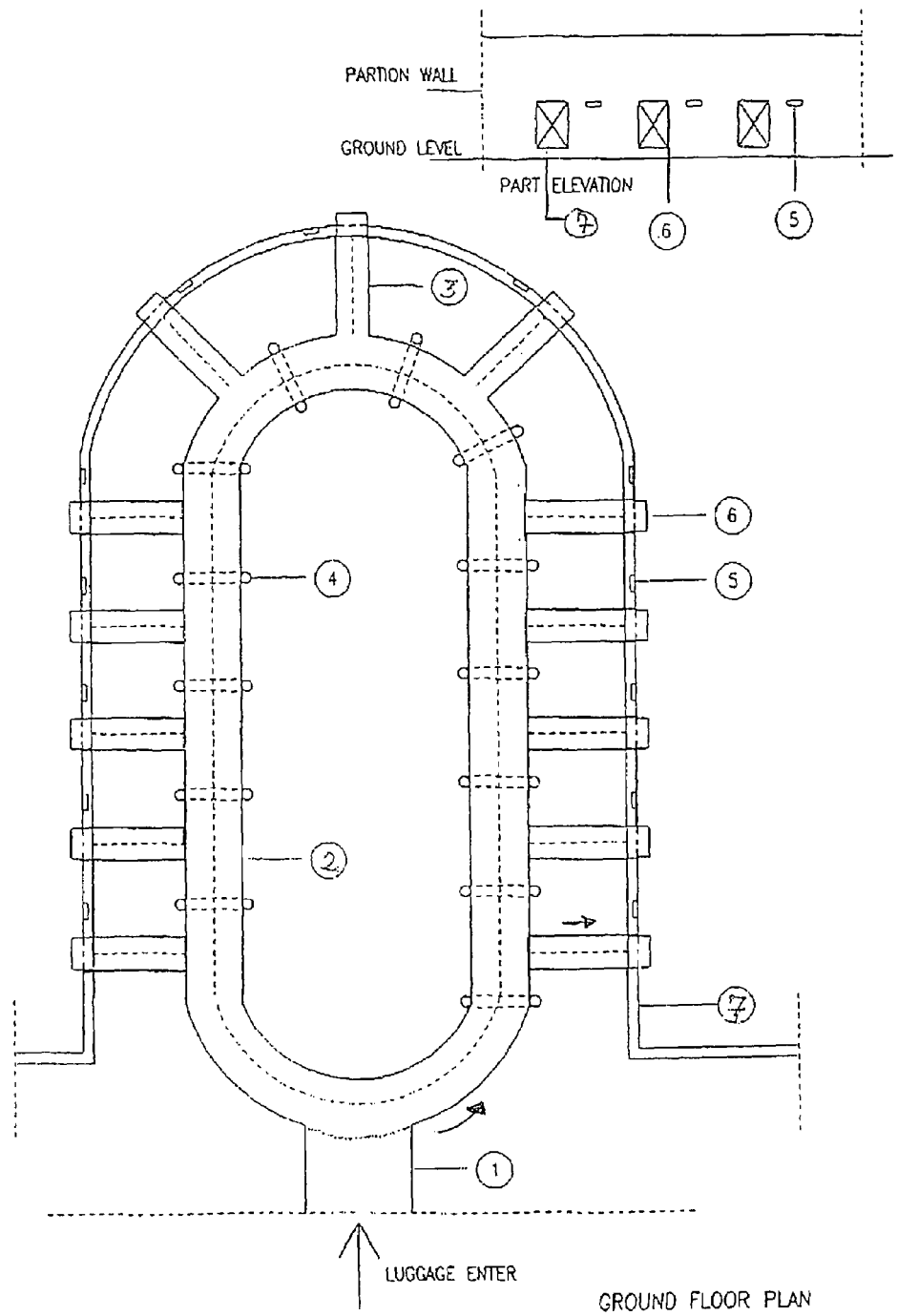
FIG. 17 is a schematic plan view of a luggage collection installation, with a detail shown in side elevation.

FIG. 17 schematically shows a luggage collection installation in an arrival lounge, with means for recognizing luggage to facilitate its removal by the entitled passenger. This installation has a luggage delivery entrance 1 where luggage unloaded from an aircraft is delivered onto an endless public conveyor belt 2 turning in a loop, of oval shape as shown by way of example. Around the oval conveyor belt 2 are a plurality of outwardly-directed subsidiary conveyor belts 3 for delivering luggage to locations where the passengers are waiting.

The conveyor belt 2 is surrounded by a partition wall 7 of corresponding shape and having a series of openings 6 through which the ends of the subsidiary conveyor belts 3 protrude for the delivery of luggage to passengers standing just outside these openings 6. The partition wall 7 preferably keeps the main conveyor belt 2 out of sight of the passengers, who only see the luggage delivered via the openings 6. These openings 6 can be equipped with curtains through which the luggage passes.

The conveyor belt 2, which turns counter-clockwise relative to FIG. 17, is associated with a series of readers 4 each of which is situated just before a corresponding subsidiary conveyor belt 3. The readers 4 are arranged to read identification data carried by luggage on the conveyor belt 2, and divert identified luggage onto the respective subsidiary conveyor 3.

Each subsidiary conveyor 3 has, integrated in the partition wall 7, an associated Boarding Card reader with a slot 5 for entering the passenger coupon part of a Boarding pass. These readers are connected via a control circuit to the readers 4 such that when a passenger coupon part of a Boarding Pass is inserted in the reader slot 5, the reader reads the stored encoded data including luggage identification data. When a piece of luggage carrying corresponding identification data passes the corresponding reader 4, the luggage is diverted from the conveyor belt 2 onto the respective subsidiary conveyor belt 3 for delivery via the opening 6 to the passenger waiting there.

The readers with slots 5 for insertion of the Boarding Pass coupons can have a memory for storing the encoded data from several Boarding Pass coupons, so that for instance a family or group of passengers traveling together can all use the same luggage outlet opening 6 by inserting their Boarding Pass coupons one after the other in the corresponding slot 5, without having to wait for the delivery of the first item(s) of luggage.

In case of lost/undelivered luggage, the readers associated with the luggage outlets, or a special reader associated with the conveyor belt 2 or with several such conveyor belts, could provide a display and/or print-out by means of an associated screen and/or printer. Such reader can be connected via a communications system to a luggage tracing system. The reader inputs identification of the lost luggage, and the communications system stores data from luggage in transit, whereby the location of the missing luggage can be determined.

With the invention as set out above, time and effort would be saved and the passenger trip would be accomplished easily, smoothly and comfortably.

Further Features of the Boarding Pass Ststem

The following is a detailed description of elements and features of the Boarding Pass system and its communications system, constituting the technical means for implementing same, taking into consideration the overall context of the invention. The implementing elements include:

(1) A Mid-Range Server, on which the main database is stored, and pertaining to the various transactions that will be executed among the various airline companies, airports, and all organizations participating in the system, to execute the operation of the required writing and reading the Boarding Pass, execute, and the financial settlement between the airline companies.

(2) A Relational Database Management System (RDBMS) containing all the particulars and data pertaining to the Boarding Pass, together with the transactions to be executed, the airline codes, the reader units and others.

(3) Communication Devices, through which connection will be made between the aforementioned Mid-Range Server and the below-mentioned sub-servers, using various types of communications, including Dial-Up, Leased Line, ISDN, etc.

(4) Fire Walls, though which monitoring and controlling all the communications with the Mid-Range Server will be made, eliminating any unauthorized entry.

(5) The above-mentioned elements will be available, and will be installed within a Main Processing Center pertaining to the authority in-charge of the new Boarding Pass system according to the invention, for carrying out all transactions pertaining to it.

(6) A sub-Server, which is a computer which will be installed with every one of the airline company participating and subscribing to the service of the Boarding Pass system of the invention, on which the data and particulars pertaining to the subscribers will be stored, together with the numbers of the new Boarding Pass issued by the airline companies and the same will be associated with the accounts of the clients, etc.

(7) Sub-Relational Database Management Systems (RDBMS): theses bases will contain such data and particulars mentioned in (6), each confined in the clients of the particular airline company only.

(8) Sub-Communication Devices through which connection between the server mentioned in (6), and the reader systems and processing systems mentioned hereunder, together with the sub-server mentioned in (6), will be made.

(9) Sub-Fire Walls, namely systems for protecting, monitoring and controlling the entries made to the systems mentioned in (6).

(10) The elements from (6) to (9) above will be installed with every airline company that participates and subscribes to the services of the Boarding Pass system of the invention.

(11) Boarding Pass reader/writer systems, namely units and systems that will be installed with the various parties that handle and make transactions with the new Boarding Pass, including security passing points, passports, transit lounge, departure gates and others, and are distinguished by the possibility of reading the thumb (print)s from the storage chip or magnetized strip and comparing them with the passenger thumbprint from the thumbprint reader devices or any specific devices.

(12) The above-mentioned reader/writer systems will be connected with the sub-server mentioned in (6), through communication systems that allow the above-listed types of connection.

(13) The reader/writer systems will contain a reader/writer for the magnetic strip and/or stored chip integrated in the Boarding Pass, together with a keyboard, through which the data and particulars pertaining to the transactions to be executed will be entered, as specified herein.

(14) The reader/writer device should be equipped with a reader screen for thumbprints, to compare the thumb (print) of the passenger with the stored one on the magnetized strip or storage chip. These devices are in common use now, similar to devices for monitoring employee attendance through thumbprints.

(15) The new Boarding Pass is a pass issued by an approved airline company, which is participant and subscriber of the services of the Boarding Pass system of the invention, this Boarding Pass being constituted of the paper or plastic or other material together with the integrated magnetized strip and/or stored chip.

(16) All the above-mentioned elements from (1) to (15) will be connected together, through an integrated communications network, as specified above.

Practical Application of the Invention

The practical implementation of the Boarding Pass system according to the invention is illustrated by way of example in the following steps:

Step 1: The client initially applies to the airline company, which is a participant and subscriber to the Boarding Pass system, and provides the required information, the desired destination(s), and settles the fare(s) of the trip(s).

Step 2: The airline company then issues the required Boarding Pass/Ticket, in accordance with the data and information approved by it, the Boarding Pass having a magnetized strip and/or storage chip including identification data such as: number of the Boarding Pass, telephone number, other data as per the invention, and the necessary security control elements. Alternatively, the airline company or travel agent issues an "electronic ticket" and the corresponding data is transmitted via the main communications system, so the Boarding Pass can be completed and issued at the luggage check-in point or at the departure gate.

Step 3: The client receives the new Boarding Pass, issued in accordance with the data and information approved by the participated airline.

Step 4: The client/traveler shall scrutinize and check the particulars of the Boarding Pass, to make sure that these have been duly completed and that there are no erasures.

Step 5: The client/traveler can then pass the new Boarding Pass through the reader system, to make sure of its correctness, on the airline company, airport, transit points, departure gates specially for the number of the Boarding Pass and the security stored elements, which confirmed many points, the most important is: non-repetition of the Boarding Pass.

Step 6: The reader system will connect with the sub-server, to communicate the information and data pertaining to the Boarding Pass, to make sure of its correctness.

Step 7: The sub-server will process the data received from the reader and pass it through the respective database, then it forwards a reply electronically as regards the correctness and soundness of the Boarding Pass that was actually issued by the airline company.

Step 8: In case of issuing the Boarding Pass by another airline company participating in the system, the transaction will be passed from the sub-server to the Mid-Range Server which contains an inclusive database containing all the particulars of all Boarding Passes issued by all airline companies participating in the Boarding Pass system according to the invention. Then this transaction will be passed to the concerned airline company, so that full matching and verification will be made.

Step 9: The result will be transmitted to the reader system, so the beneficiary will be able to make sure whether the Boarding Pass is correct or not, and to refuse the transaction if the Boarding Pass not correct.

Step 10: In case of correctness of the Boarding Pass, the reader system will issue a message to the beneficiary of the completion of the operation and transaction.

Further steps such as baggage check-in, automatic clearance in case of change of airline company, departure formalities, transit operations, boarding the plane, automatic counting of boarded passengers, automatic arrival card printing, luggage collection etc. are as described above.

The invention is subject to many variations from the examples described and shown in the drawings. As illustrated, normally the Boarding Pass is made of a single sheet of pliable paper like that of existing Boarding Cards, but having magnetized strips preferably merged in thick portions. However, the thin portion forming the main coupon part of the Boarding card can consist of a folded over sheet, forming on the rear of the Boarding Pass a pocket that can be used by the airline to collate related papers when the main coupon part is collected. Such folded pocket can conveniently be arranged so it does not overlap with the thick portion of the main coupon part, instead, the folded pocket occupies all or part of the thin portion of the main coupon part.

The storage chip can include a microprocessor for carrying out operations relative to managing a passenger's account for purchase operations, or for automatic clearance in case a passenger changes airline company, or any other operations.

The passenger coupon part of the Boarding Pass can also be configured to perform as a key for hotel room doors (like in the aforementioned GB 2351 379-A), or for access to hotel floors, or for allowing access to other places.

The invention claimed is:

1. A luggage collection installation located at a place of arrival where passengers disembark from an aircraft or other means of transportation in which passengers and thier luggage are transported, the disembarked passengers having with them passenger coupon parts of boarding passes, which passenger coupon parts contain encoded luggage identification corresponding to identification data on transported luggage, the installation comprising:
   a principal conveyor belt that receives luggage unloaded from said aircraft or other means of transportation;
   plurality of luggage outlets each comprising a subsidiary conveyor belt located outwardly of different locations of the principal conveyor belt, for delivering luggage to locations where passengers can wait for their luggage to be delivered;
   each subsidiary conveyor belt being associated with a reader with a slot for entering the passenger coupon part of a boarding pass, each reader being situated adjacent to a location of its subsidiary conveyor belt where the subsidiary conveyor belt delivers luggage to waiting passengers;
   means for reading luggage identification data carried by luggage to be collected on the principal conveyor belt, which luggage identification data corresponds to encoded luggage identification data stored in the passenger coupon part of the boarding passes; and
   control means, that connect the readers associated with the subsidiary conveyor belts and said reading means of the principal conveyor belt, for diverting luggage from the principal conveyor belt onto a subsidiary conveyor belt when the luggage identification data associated with the luggage corresponds to that on the passenger coupon part of a boarding pass inserted in the reader of the subsidiary conveyor belt.

2. The installation of claim 1, wherein at least one of said readers for the passenger coupon parts of the boarding cards is arranged to receive and store luggage identification data from several successively introduced passenger coupon parts.

3. The installation of claim 1, comprising a reader/writer for reading luggage identification data carried by magnetic tapes, bar codes, zebra codes or proximity-detectable storage chips associated with the pieces of luggage.

4. A method of processing a boarding pass of which a passenger coupon part contains encoded luggage identification data corresponding to identification data on transported luggage, for the collection of transported luggage at a destination or transit point equipped with a luggage collection installation according to claim 1, wherein the passenger coupon part of the boarding pass is passed through a reader at the luggage collection installation, and luggage is diverted from the principal conveyor belt onto the subsidiary conveyor belt associated with said luggage outlet when the identification data associated with the luggage corresponds to that on the passenger coupon part of a boarding pass read by the reader.

5. A method of processing a boarding pass of which a passenger coupon part contains encoded luggage identification data corresponding to identification data on transported luggage, using a luggage collection installation of claim 1, wherein if transported luggage is missing at a destination or transit point, the passenger coupon part of the boarding pass is passed through a reader/writer connected via a communications system to a luggage tracing system for inputting identification data of luggage in transit and determining the location of the luggage.

6. The method of claim 5, wherein said reader/writer at the destination or transit point is associated with a printer and/or a screen for providing a print-out and/or a display of information relative to the luggage and its location.

7. The installation of claim 1, wherein said principal conveyor belt is an endless belt arranged as a loop.

8. The installation of claim 7, comprising a luggage delivery entrance where luggage unloaded from said aircraft or other means of transportation is delivered onto said principal conveyor belt.

9. The installation of claim 1, wherein said luggage outlets where passengers can wait for their luggage to be delivered are separated from said principal conveyor by a partition.

10. The installation of claim 9, wherein said partition has openings corresponding to the subsidiary conveyors and through which the subsidiary conveyors pass, said openings being equipped with curtains through which the delivered luggage passes.

11. The installation of claim 1, wherein each of said readers associated with the subsidiary conveyor belts has a slot for receiving the passenger coupon part of a boarding pass.

12. A system for facilitating the collection of luggage at a place of arrival where passengers disembark from an aircraft or other means of transportation in which passengers and their luggage are transported, the disembarked passengers having with them passenger coupon parts of boarding passes, which passenger coupon parts contain encoded luggage identification corresponding to identification data on transported luggage, the system comprising:
   1) at a point of departure, means for encoding in passenger coupon parts of the boarding cards encoded luggage identification data corresponding to luggage identification data associated with pieces of luggage checked by the passengers; and
   2) at a place of arrival, a luggage collection installation comprising:
   a principal conveyor belt that receives luggage unloaded from said aircraft or other means of transportation;
      a plurality of luggage outlets each comprising a subsidiary conveyor belt located outwardly of different locations of the principal conveyor belt, for delivering luggage to locations where passengers can wait;
   each subsidiary conveyor belt being associated with a reader with a slot for entering the passenger coupon part of a boarding pass, each reader being situated adjacent to a location of its subsidiary conveyor belt where the subsidiary conveyor belt delivers luggage to waiting passengers;
      means for reading luggage identification data carried by luggage to be collected on the principal conveyor belt, which luggage identification data corresponds to encoded luggage identification data stored in the passenger coupon part of the boarding passes; and
      control means, that connect the readers associated with the subsidiary conveyor belts and said reading means of the principal conveyor belt, for diverting luggage from the principal conveyor belt onto a subsidiary conveyor belt when the luggage identification data associated with the luggage corresponds to that on the passenger coupon part of a boarding pass inserted in the reader of the subsidiary conveyor belt.

13. The system of claim 12, wherein the luggage identification data associated with pieces of luggage is carried by magnetic tapes, bar codes, zebra codes or proximity-detectable storage chips associated with the pieces of luggage.

14. The system of claim 12, wherein the luggage collection installation comprises at least one reader for the passenger coupon parts of the boarding cards that is arranged to receive and store luggage identification data from several successively introduced passenger coupon parts.

* * * * *